(12) United States Patent
Oami

(10) Patent No.: US 12,650,727 B2
(45) Date of Patent: Jun. 9, 2026

(54) INFORMATION ACQUISITION APPARATUS, INFORMATION ACQUISITION METHOD, AND STORAGE MEDIUM

(71) Applicant: NEC Corporation, Tokyo (JP)

(72) Inventor: Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 531 days.

(21) Appl. No.: 18/007,537

(22) PCT Filed: Jun. 3, 2020

(86) PCT No.: PCT/JP2020/021881
§ 371 (c)(1),
(2) Date: Dec. 1, 2022

(87) PCT Pub. No.: WO2021/245823
PCT Pub. Date: Dec. 9, 2021

(65) Prior Publication Data
US 2023/0214010 A1 Jul. 6, 2023

(51) Int. Cl.
*G06F 3/01* (2006.01)
*G06V 40/18* (2022.01)

(52) U.S. Cl.
CPC ............ *G06F 3/013* (2013.01); *G06V 40/197* (2022.01)

(58) Field of Classification Search
CPC ....................................................... G06F 3/013
USPC .......................................................... 382/103
See application file for complete search history.

(56) References Cited

U.S. PATENT DOCUMENTS

| | | | | |
|---|---|---|---|---|
| 9,953,149 B2 * | 4/2018 | Tussy | .................... | H04W 12/06 |
| 2010/0110374 A1 * | 5/2010 | Raguin | ................ | A61B 3/1216 |
| | | | | 382/117 |

FOREIGN PATENT DOCUMENTS

| | | |
|---|---|---|
| JP | H11-347016 A | 12/1999 |
| JP | 2000-123148 A | 4/2000 |
| JP | 2000-132681 A | 5/2000 |
| JP | 2004-030564 A | 1/2004 |
| JP | 2006-126899 A | 5/2006 |
| JP | 2008-041034 A | 2/2008 |
| JP | 2009-211370 A | 9/2009 |
| JP | 2018-124733 A | 8/2018 |
| WO | 2008/018422 A1 | 2/2008 |
| WO | 2016/088415 A1 | 9/2017 |
| WO | 2018/052003 A1 | 3/2018 |

OTHER PUBLICATIONS

International Search Report for PCT Application No. PCT/JP2020/021881, mailed on Sep. 29, 2020.
Katayama, Takamitsu: "3D head movement/line-of-sight measurement using a camera (driver monitoring in a vehicle)", Video Information Industrial, Oct. 1, 2015, vol. 47, No. 10, pp. 35-38, Japan.

(Continued)

*Primary Examiner* — Gabriel I Garcia
(74) *Attorney, Agent, or Firm* — Sughrue Mion, PLLC

(57) ABSTRACT

There is provided an information acquisition apparatus including an output means for outputting guidance information for guiding a subject to move a head while gazing at a predetermined position, and an image acquisition means for acquiring an image including an iris of the subject after outputting the guidance information.

19 Claims, 25 Drawing Sheets

(56) References Cited

OTHER PUBLICATIONS

JP Office Action for JP Application No. 2022-529206, mailed on Aug. 3, 2023 with English Translation.
Shigeyoshi Nakajima et al, "Wearable Accelerometer for Numerical Diagnosis of Human Walk Using DCT", ITE Technical Report, vol. 32, No. 7, pp. 33-36, Feb. 2008.

* cited by examiner

| | |
|---|---|
| 101 | PROCESSOR |
| 102 | RAM |
| 103 | ROM |
| 104 | HDD |
| 105 | COMMUNICATION I/F |
| 106 | OPERATION DEVICE |
| 107 | IMAGING DEVICE |
| 108 | DISPLAY DEVICE |

Keep looking straight ahead and slowly move your head upward.

111 — OUTPUT UNIT

112 — DISPLAY CONTROL UNIT

113 — IMAGE ACQUISITION UNIT

114 — FEATURE AMOUNT GENERATION UNIT

115 — I/F UNIT

116 — EYELID DETECTION UNIT

1

211 — I/F UNIT

212 — MATCHING UNIT

213 — FEATURE AMOUNT STORAGE UNIT

Figure 18:
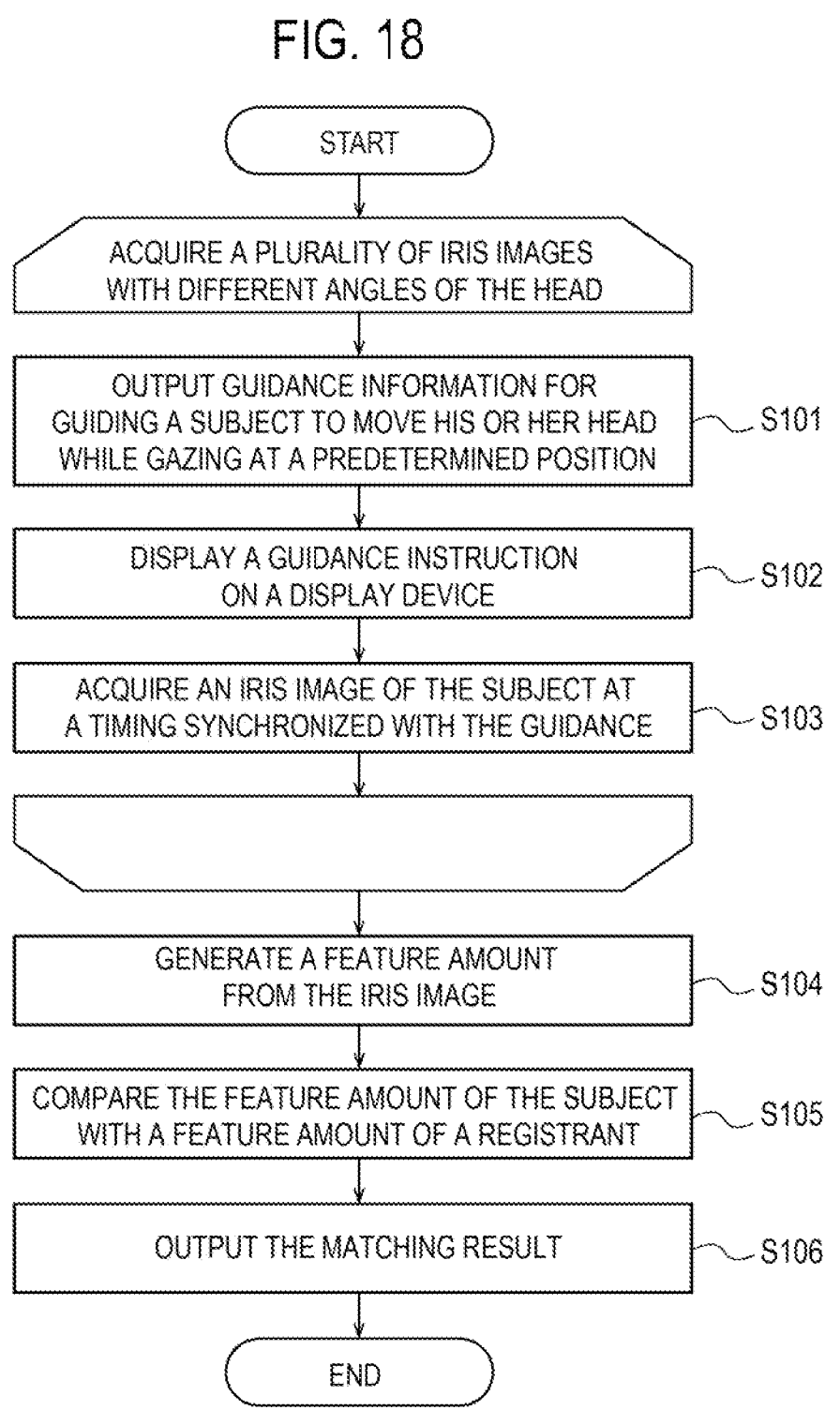

START

ACQUIRE A PLURALITY OF IRIS IMAGES
WITH DIFFERENT ANGLES OF THE HEAD

OUTPUT GUIDANCE INFORMATION FOR
GUIDING A SUBJECT TO MOVE HIS OR HER HEAD
WHILE GAZING AT A PREDETERMINED POSITION — S101

DISPLAY A GUIDANCE INSTRUCTION
ON A DISPLAY DEVICE — S102

ACQUIRE AN IRIS IMAGE OF THE SUBJECT AT
A TIMING SYNCHRONIZED WITH THE GUIDANCE — S103

GENERATE A FEATURE AMOUNT
FROM THE IRIS IMAGE — S104

COMPARE THE FEATURE AMOUNT OF THE SUBJECT
WITH A FEATURE AMOUNT OF A REGISTRANT — S105

OUTPUT THE MATCHING RESULT — S106

END

FIG. 20

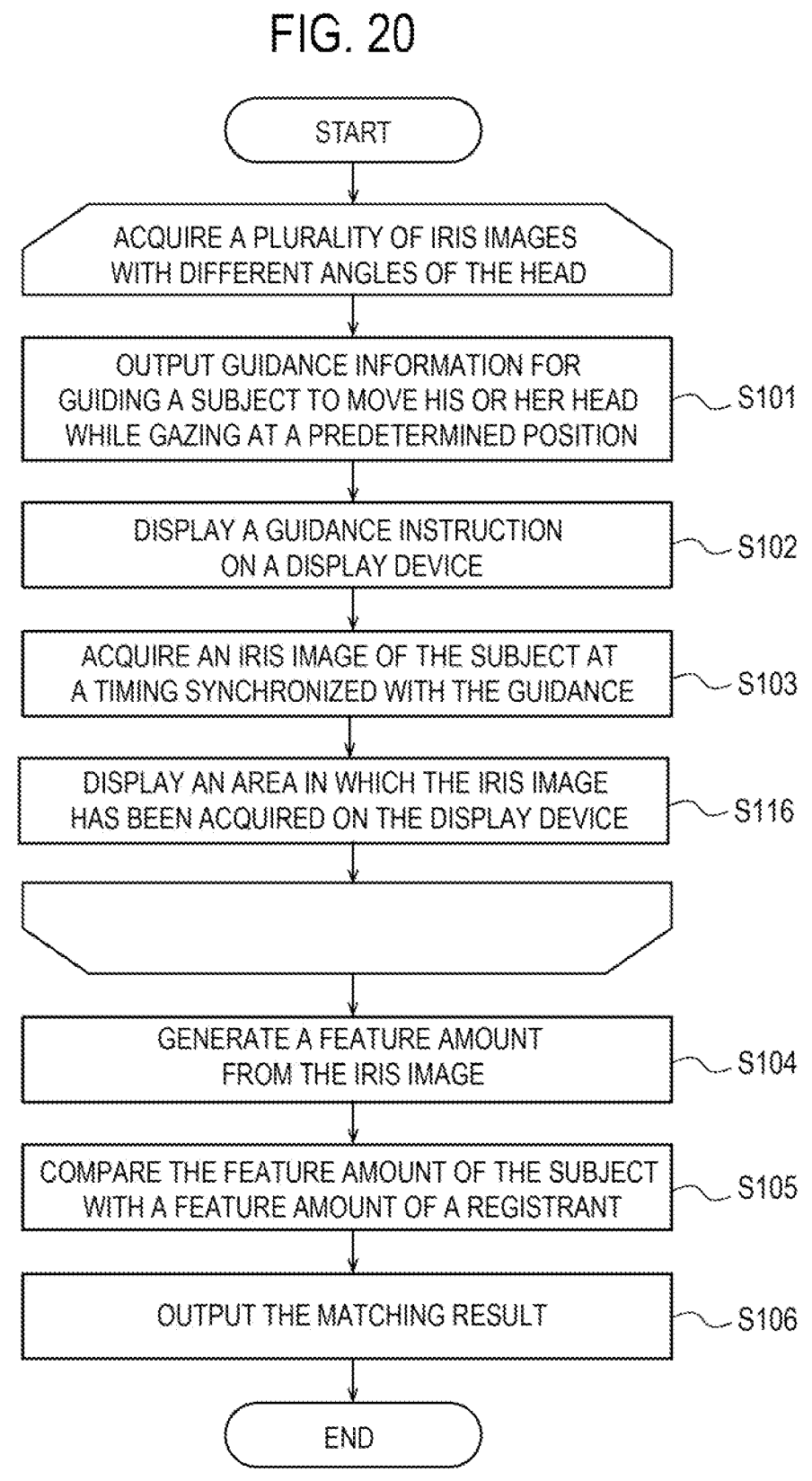

START

ACQUIRE A PLURALITY OF IRIS IMAGES
WITH DIFFERENT ANGLES OF THE HEAD

OUTPUT GUIDANCE INFORMATION FOR
GUIDING A SUBJECT TO MOVE HIS OR HER HEAD
WHILE GAZING AT A PREDETERMINED POSITION — S101

DISPLAY A GUIDANCE INSTRUCTION
ON A DISPLAY DEVICE — S102

ACQUIRE AN IRIS IMAGE OF THE SUBJECT AT
A TIMING SYNCHRONIZED WITH THE GUIDANCE — S103

DISPLAY AN AREA IN WHICH THE IRIS IMAGE
HAS BEEN ACQUIRED ON THE DISPLAY DEVICE — S116

GENERATE A FEATURE AMOUNT
FROM THE IRIS IMAGE — S104

COMPARE THE FEATURE AMOUNT OF THE SUBJECT
WITH A FEATURE AMOUNT OF A REGISTRANT — S105

OUTPUT THE MATCHING RESULT — S106

END

FIG. 22

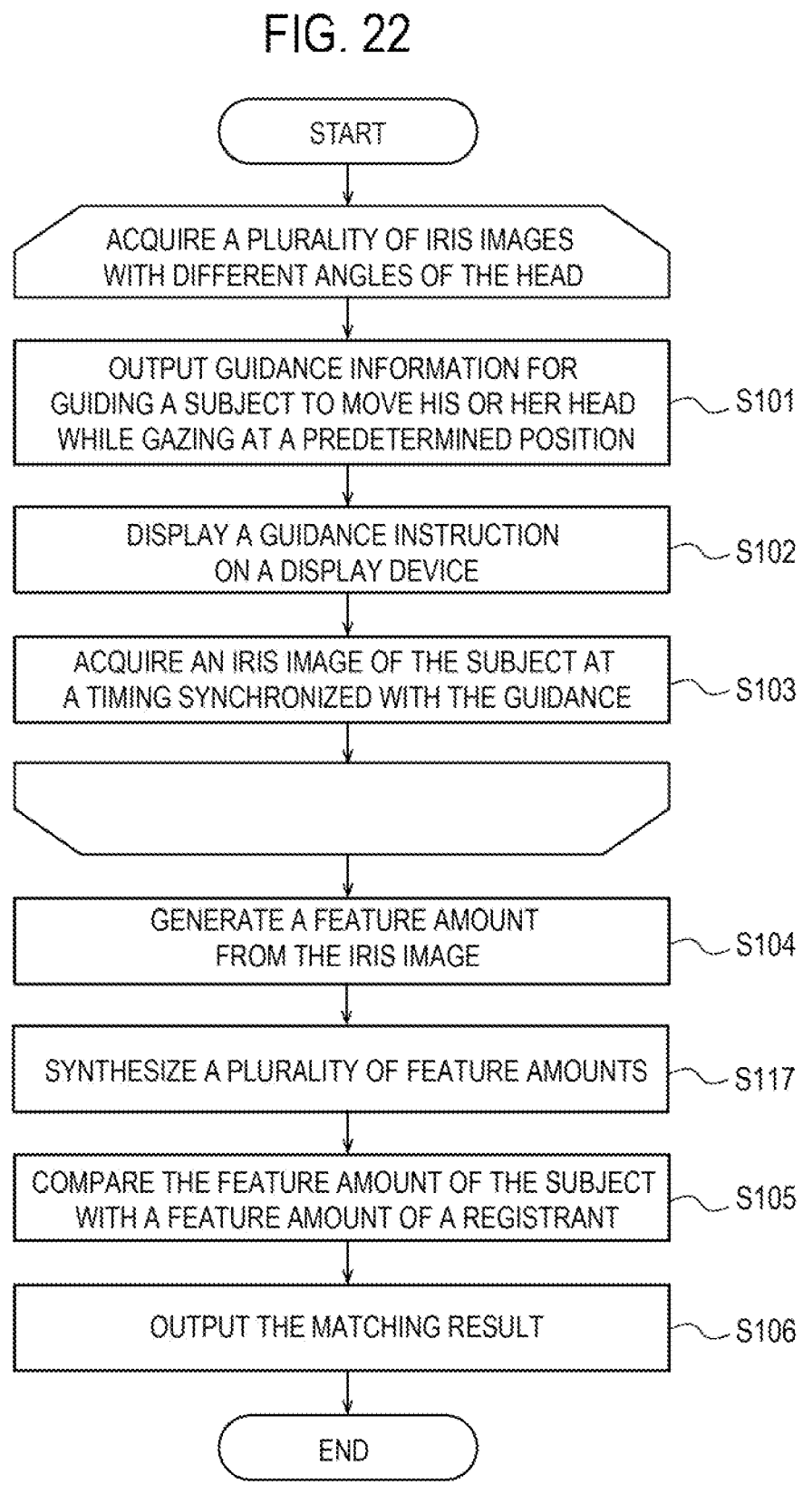

START

ACQUIRE A PLURALITY OF IRIS IMAGES
WITH DIFFERENT ANGLES OF THE HEAD

OUTPUT GUIDANCE INFORMATION FOR
GUIDING A SUBJECT TO MOVE HIS OR HER HEAD
WHILE GAZING AT A PREDETERMINED POSITION — S101

DISPLAY A GUIDANCE INSTRUCTION
ON A DISPLAY DEVICE — S102

ACQUIRE AN IRIS IMAGE OF THE SUBJECT AT
A TIMING SYNCHRONIZED WITH THE GUIDANCE — S103

GENERATE A FEATURE AMOUNT
FROM THE IRIS IMAGE — S104

SYNTHESIZE A PLURALITY OF FEATURE AMOUNTS — S117

COMPARE THE FEATURE AMOUNT OF THE SUBJECT
WITH A FEATURE AMOUNT OF A REGISTRANT — S105

OUTPUT THE MATCHING RESULT — S106

END

3

301 — OUTPUT MEANS

302 — IMAGE ACQUISITION MEANS

304 — EYELID DETECTION MEANS

3

301 — OUTPUT MEANS

302 — IMAGE ACQUISITION MEANS

305 — ANGLE DETECTION MEANS

10

3 — INFORMATION ACQUISITION APPARATUS

11 — MATCHING APPARATUS

INFORMATION ACQUISITION APPARATUS, INFORMATION ACQUISITION METHOD, AND STORAGE MEDIUM

This application is a National Stage Entry of PCT/JP2020/021881 filed on Jun. 3, 2020, the contents of all of which are incorporated herein by reference, in their entirety.

TECHNICAL FIELD

This disclosure relates to an information acquisition apparatus, an information acquisition method, and a storage medium.

BACKGROUND ART

PTL 1 discloses an iris authentication apparatus that captures an iris image of an authentication subject and performs iris authentication. The iris authentication apparatus is provided with a display unit which displays attention at an upper side of an image capturing unit which captures an iris image.

Accordingly, it is described in PTL 1 that, since the eye of the subject can be opened, it is possible to reduce the possibility of erroneous authentication caused by the iris being covered by the eyelashes or the upper eyelid.

CITATION LIST

Patent Literature

PTL 1: International Publication No. 2018/052003

SUMMARY OF INVENTION

Technical Problem

In the iris authentication apparatus as described in PTL 1, there is a case where the reduction of the influence caused by covering the iris with the eyelid or the like is not sufficient.

It is an object of this disclosure to provide an information acquisition apparatus, an information acquisition method, and a storage medium capable of further reducing an influence caused by covering and hiding an iris by an eyelid or the like.

Solution to Problem

According to an aspect of this disclosure, there is provided an information acquisition apparatus including an output means for outputting guidance information for guiding a subject to move a head while gazing at a predetermined position, and an image acquisition means for acquiring an image including an iris of the subject after outputting the guidance information.

According to another aspect of this disclosure, there is provided an information acquisition method including outputting guidance information for guiding a subject to move a head while gazing at a predetermined position, and acquiring an image including an iris of the subject after outputting the guidance information.

According to another aspect of this disclosure, there is provided a storage medium storing a program for causing a computer to execute an information acquisition method including outputting guidance information for guiding a subject to move a head while gazing at a predetermined position, and acquiring an image including an iris of the subject after outputting the guidance information.

BRIEF DESCRIPTION OF DRAWINGS

FIG. 18 is a flowchart showing an outline of a matching process performed in an iris matching system according to a seventh example embodiment.

FIG. 20 is a flowchart showing an outline of a matching process performed in an iris matching system according to an eighth example embodiment.

FIG. 22 is a flowchart showing an outline of a matching process performed in an iris matching system according to a ninth example embodiment.

DESCRIPTION OF EMBODIMENTS

Figure 1:
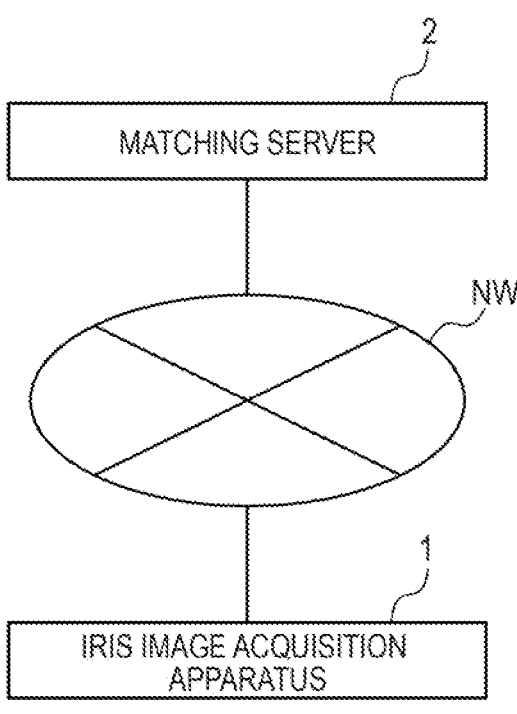
FIG. 1 is a schematic diagram showing an overall configuration of an iris matching system according to a first example embodiment.

Example embodiments of this disclosure will now be described with reference to the accompanying drawings. In the drawings, similar elements or corresponding elements are denoted by the same reference numerals, and description thereof may be omitted or simplified.

First Example Embodiment

FIG. 1 is a schematic diagram showing an overall configuration of an iris matching system according to this example embodiment. The iris matching system includes an iris image acquisition apparatus 1 and a matching server 2. The iris image acquisition apparatus 1 and the matching server 2 are communicably connected via a network NW.

The iris matching system is a biometric authentication system that captures an iris image of a subject and compares a feature amount of the captured iris image with a feature amount of an iris image of a registrant registered in advance to determine whether or not the subject and the registrant are the same person.

The iris image acquisition apparatus 1 is an information acquisition apparatus that captures an iris image of the subject and extracts the feature amount. The iris image acquisition apparatus 1 may be, for example, an identity confirmation terminal used at an immigration site, an administrative office, an entrance gate of a facility, or the like. In this case, the iris image acquisition apparatus 1 is used for determining whether or not the subject is a person who is authorized to enter the country, use the government office, or enter the facility. The iris image acquisition apparatus 1 may be an information processing apparatus such as a smartphone or a personal computer (PC). In this case, the iris image acquisition apparatus 1 can confirm the identity by iris authentication at the time of login, at the time of use of application software, at the time of electronic payment, or the like. As described above, a user of the iris image acquisition apparatus 1 may be the subject himself or herself, or may be a person who confirms the identity of the subject.

The matching server 2 is a matching apparatus that acquires a feature amount of the subject from the iris image acquisition apparatus 1 and compares the feature amount of the subject with the feature amount of the registrant.

The network NW may be various networks such as a local area network (LAN) and a wide area network (WAN). The network NW may be, for example, the internet, or may be a closed area network of an institution that utilizes the results of iris matching.

In FIG. 1, the iris matching system includes the iris image acquisition apparatus 1 and the matching server 2, but the configuration of the iris matching system is not limited thereto. For example, the iris matching system may be a single apparatus in which the functions of the iris image acquisition apparatus 1 and the matching server 2 are integrated, or may be a system including three or more apparatuses.

Figure 2:
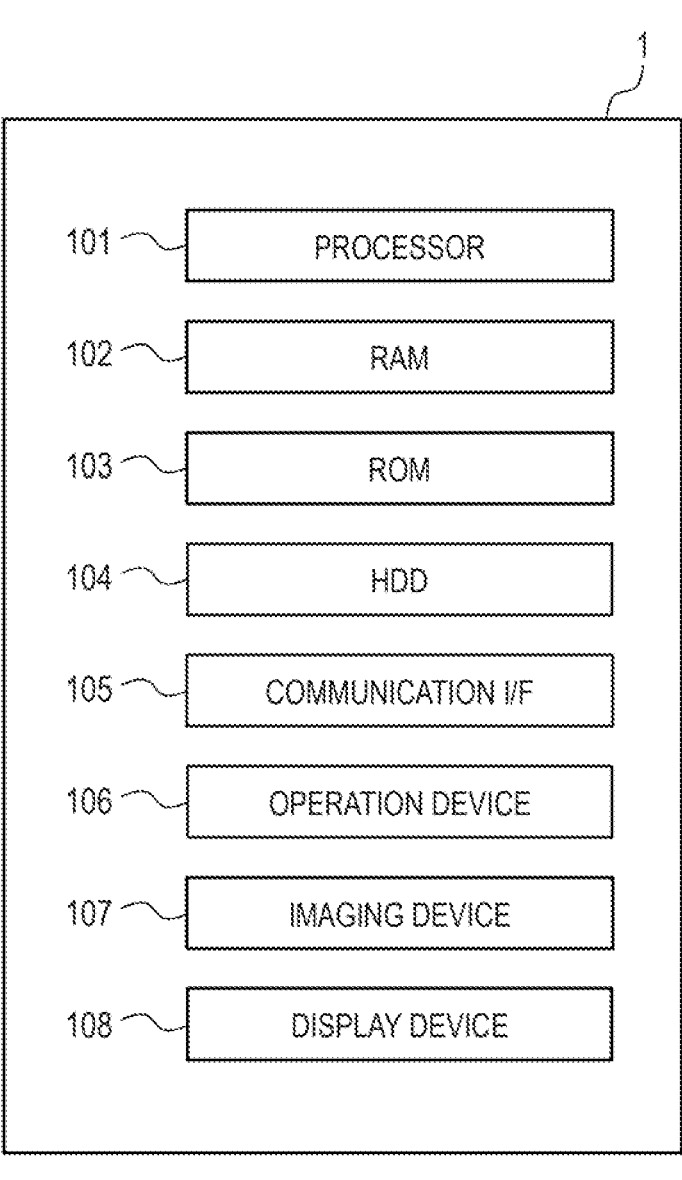
FIG. 2 is a block diagram showing a hardware configuration of an iris image acquisition apparatus according to the first example embodiment.

FIG. 2 is a block diagram showing a hardware configuration example of the iris image acquisition apparatus 1. The iris image acquisition apparatus 1 includes a processor 101, a random access memory (RAM) 102, a read only memory (ROM) 103, and a hard disk drive (HDD) 104. The iris image acquisition apparatus 1 includes a communication interface (I/F) 105, an operation device 106, an imaging device 107, and a display device 108. The units of the iris image acquisition apparatus 1 are connected to each other via a bus, a wiring, a driving device, and the like (not shown).

In FIG. 2, each unit constituting the iris image acquisition apparatus 1 is illustrated as an integrated apparatus, but some of these functions may be provided by an external apparatus. For example, the operation device 106, the imaging device 107, and the display device 108 may be external devices different from the components constituting the functions of the computer including the processor 101 and the like.

The processor 101 performs a predetermined operation in accordance with a program stored in the ROM 103, the HDD 104, or the like, and also has a function of controlling each unit of the iris image acquisition apparatus 1. As the processor 101, one of a central processing unit (CPU), a graphics processing unit (GPU), a field-programmable gate array (FPGA), a digital signal processor (DSP), and an application specific integrated circuit (ASIC) may be used, or a plurality of those may be used in parallel. The RAM 102 is configured by a volatile storage medium and provides a temporary memory area necessary for the operation of the processor 101. The ROM 103 is configured by a non-volatile storage medium, and stores necessary information such as a program used for the operation of the iris image acquisition apparatus 1. The HDD 104 is configured by a non-volatile storage medium, and is a storage device for storing a database, storing an operation program of the iris image acquisition apparatus 1, and the like.

The communication I/F 105 is a communication interface based on standards such as Ethernet (registered trademark) and Wi-Fi (registered trademark). The communication I/F 105 is a module for communicating with other apparatuses such as the matching server 2.

The operation device 106 is a device for a user interface such as a button, a touch panel, or the like for operating the iris image acquisition apparatus 1 by a subject, an administrator, or the like.

The imaging device 107 is a digital camera including a complementary metal-oxide-semiconductor (CMOS) image sensor, a charge coupled device (CCD) image sensor, and the like as light receiving elements. The imaging device 107 captures an image including the iris of the subject to obtain digital image data. The imaging device 107 may be a visible light camera that captures an optical image by visible light or an infrared light camera that captures an optical image by infrared light.

The display device 108 is a liquid crystal display, an organic light emitting diode (OLED) display, or the like, and is used for displaying information, a graphical user interface (GUI) for operation input, or the like. The operation device 106 and the display device 108 may be integrally formed as a touch panel.

The iris image acquisition apparatus 1 may further include a light source device for irradiating the iris of the subject with light having a wavelength suitable for imaging with visible light or infrared light. The light source device irradiates light to the subject in synchronization with photographing by the imaging device 107.

Figure 3:
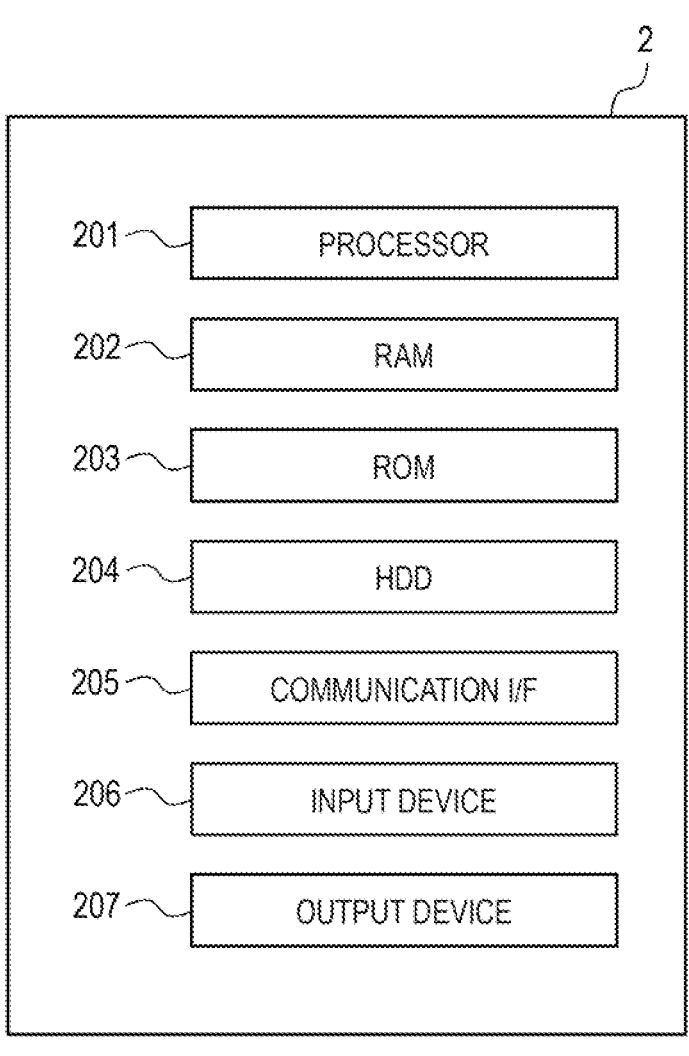
FIG. 3 is a block diagram showing a hardware configuration of a matching server according to the first example embodiment.

FIG. 3 is a block diagram showing a hardware configuration example of the matching server 2. The matching server 2 includes a processor 201, a RAM 202, a ROM 203, an HDD 204, a communication I/F 205, an input device 206, and an output device 207. The units of the matching server 2 are connected to each other via a bus, wiring, a drive device, and the like (not shown). Since the processor 201, the RAM 202, the ROM 203, the HDD 204, and the communication I/F 205 are similar to the processor 101, the RAM 102, the ROM 103, the HDD 104, and the communication I/F 105, their description will be omitted.

The input device 206 is a keyboard, a pointing device, or the like, and is used by an administrator of the matching server 2 to operate the matching server 2. Examples of the pointing device include a mouse, a trackball, a touch panel, and a pen tablet. The output device 207 is, for example, a display device having a configuration similar to that of the display device 108. The input device 206 and the output device 207 may be integrally formed as a touch panel.

The hardware configurations of the iris image acquisition apparatus 1 and the matching server 2 are merely examples, and a device other than them may be added, or a part of the devices may not be provided. Some devices may be replaced with other devices having similar functions. Further, some functions of this example embodiment may be provided by other devices via a network, or the functions of this example embodiment may be distributed among a plurality of devices. For example, the HDDs 104 and 204 may be replaced with solid state drives (SSD) using a semiconductor memory. The HDDs 104 and 204 may be replaced with cloud storage. As described above, the hardware configurations of the iris image acquisition apparatus 1 and the matching server 2 can be appropriately changed.

Figure 4:
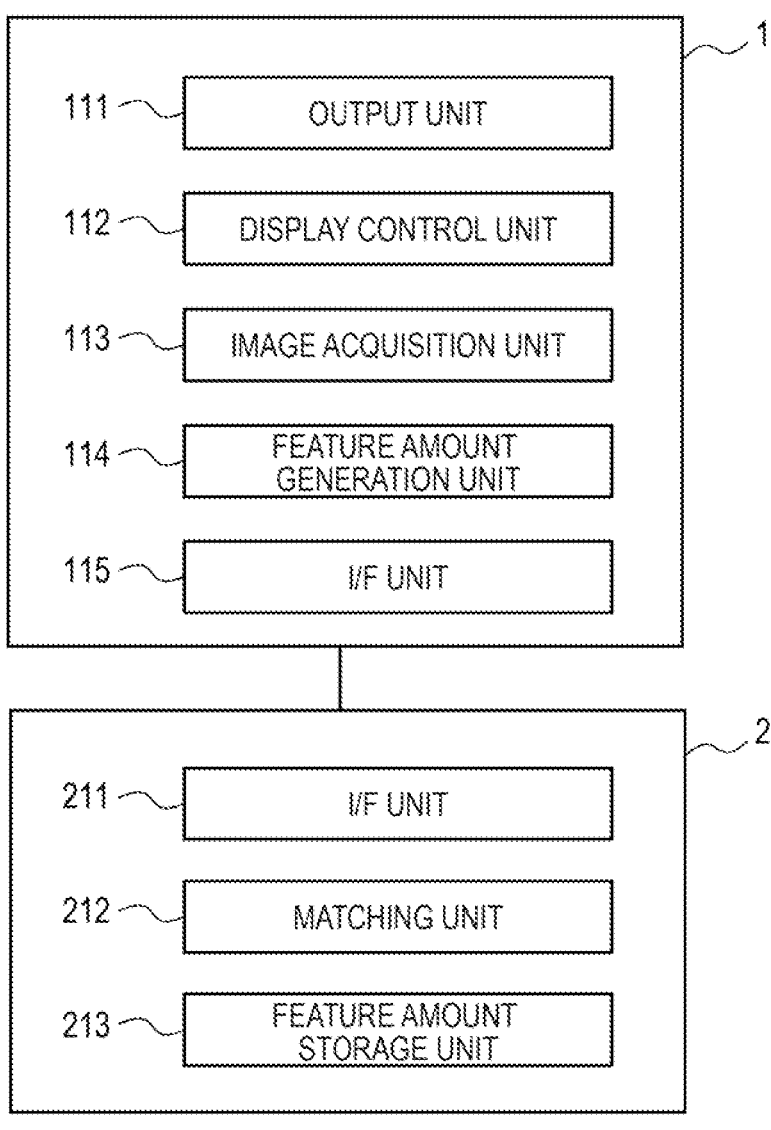
FIG. 4 is a functional block diagram of the iris matching system according to the first example embodiment.

FIG. 4 is a functional block diagram of the iris matching system according to this example embodiment. The iris image acquisition apparatus 1 includes an output unit 111, a display control unit 112, an image acquisition unit 113, a feature amount generation unit 114, and an I/F unit 115. The matching server 2 includes an I/F unit 211, a matching unit 212, and a feature amount storage unit 213.

The processor 101 loads a program stored in the ROM 103, the HDD 104, or the like into the RAM 102 and executes the program to perform predetermined arithmetic processing. Further, the processor 101 controls units of the iris image acquisition apparatus 1, such as the communication I/F 105, the operation device 106, the imaging device 107, and the display device 108, based on the program. Thus, the processor 101 realizes functions of the output unit 111, the display control unit 112, the image acquisition unit 113, the feature amount generation unit 114, and the I/F unit 115. The output unit 111, the display control unit 112, the image acquisition unit 113, and the feature amount generation unit 114 may be referred to more generally as an output means, a display control means, an image acquisition means, and a feature amount generation means, respectively.

The processor 201 loads a program stored in the ROM 203, the HDD 204, or the like into the RAM 202 and executes the program to perform predetermined arithmetic processing. The processor 201 controls units of the matching server 2, such as the communication I/F 205, the input device 206, and the output device 207, based on the program. Thus, the processor 201 realizes functions of the I/F unit 211, the matching unit 212, and the feature amount storage unit 213. The matching unit 212 and the feature amount storage unit 213 may be referred to more generally as a matching means and a feature amount storage means, respectively. Specific contents of the processing performed by each functional block will be described later.

Note that some or all of the functions of the functional blocks described in the iris image acquisition apparatus 1 and the matching server 2 in FIG. 4 may be provided in an apparatus outside the iris image acquisition apparatus 1 and the matching server 2. In other words, the above-described functions may be implemented by cooperation of the iris image acquisition apparatus 1 and the matching server 2 with other apparatuses. Further, the iris image acquisition apparatus 1 and the matching server 2 may be an integrated apparatus, and some of the functions of the functional blocks described in one of the iris image acquisition apparatus 1 and the matching server 2 may be implemented by the other apparatus. That is, the apparatuses provided with each functional block in FIG. 4 is not limited to that shown in FIG. 4.

Figure 5:
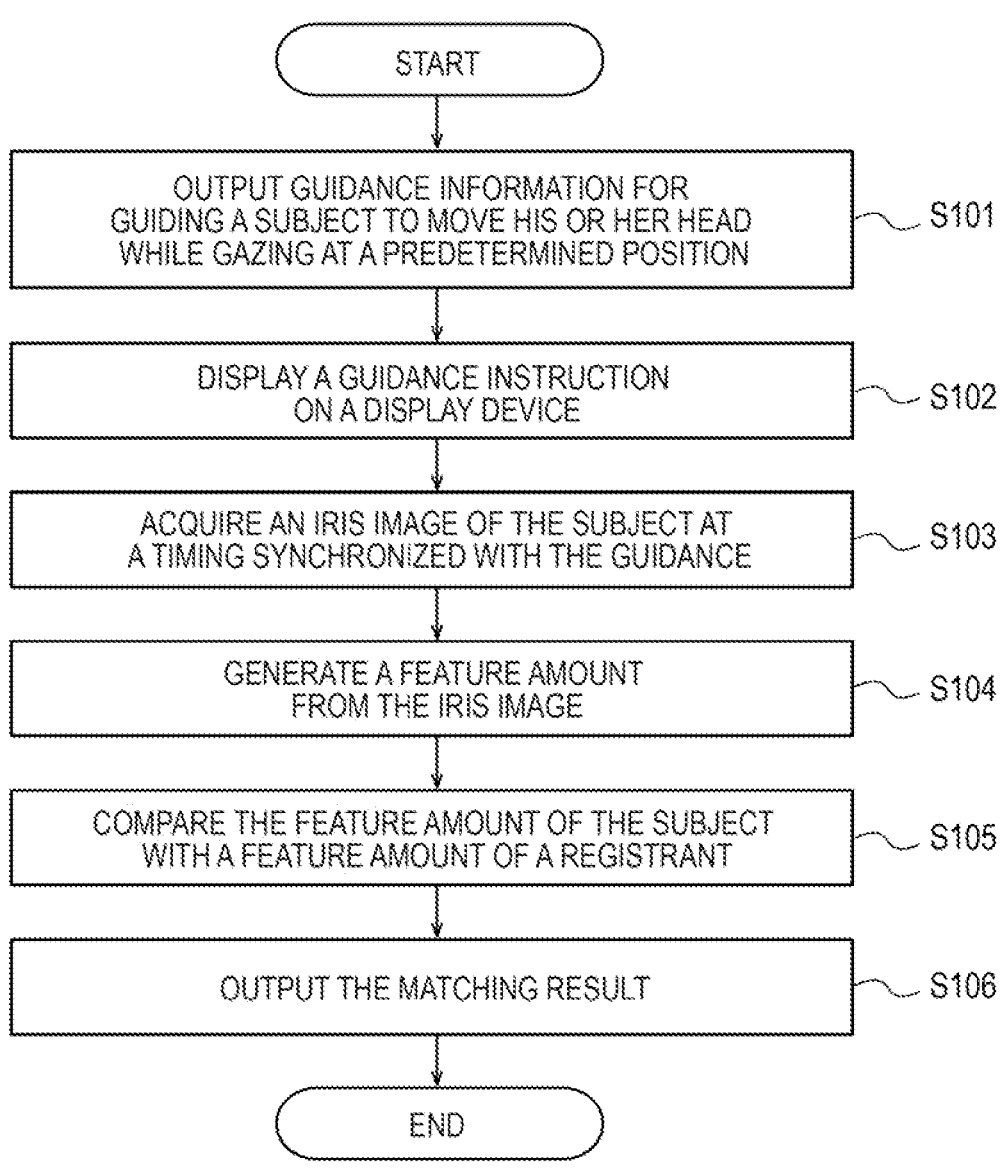
FIG. 5 is a flowchart showing an outline of a matching process performed in the iris matching system according to the first example embodiment.

FIG. 5 is a flowchart showing an outline of a matching process performed in the iris matching system according to this example embodiment. The processing of this example embodiment is started when the user performs an operation for performing iris authentication of the subject to the iris image acquisition apparatus 1. In this case, it is assumed that the subject faces the imaging device 107 of the iris image acquisition apparatus 1, and the iris of the subject is included in the photographing range of the imaging device 107.

In step S101, the output unit 111 outputs guidance information for guiding the subject to move his or her head while gazing at a predetermined position. The guidance information may be, for example, display information for causing the display device 108 to display guidance instructions such as messages and images for prompting an operation.

In step S102, the display control unit 112 controls the display device 108 based on the guidance information. Thereby, the display device 108 displays a guidance instruction for guiding the subject to move the head while gazing at the predetermined position.

Figure 6:
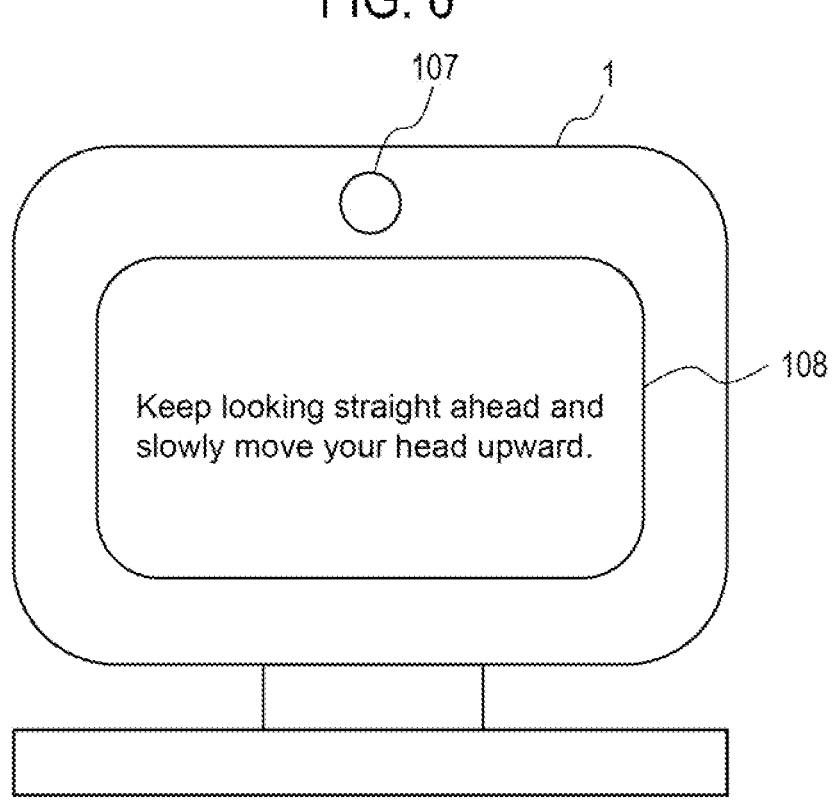
FIG. 6 is an example of a guidance instruction displayed on a display device in the matching process according to the first example embodiment.

FIG. 6 shows an example of a guidance instruction displayed on the display device 108 in the matching process according to this example embodiment. The imaging device 107 and the display device 108 are arranged on the front surface of the iris image acquisition apparatus 1. The imaging device 107 and the display device 108 are arranged close to each other so that when the subject faces the iris image acquisition apparatus 1, the iris of the subject is included in the photographing range of the imaging device 107 and the subject can see the display device 108. Accordingly, when the subject looks at the display device 108, the line of sight of the subject is substantially directed toward the imaging device 107.

The display device 108 displays a message "Keep looking straight ahead and slowly move your head upward." under the control of the display control unit 112. The subject reads this message and moves the head upward while gazing forward (the direction of the imaging device 107).

In step S103, the image acquisition unit 113 controls the imaging device 107 in synchronization with the guidance in step S102. Thereby, the imaging device 107 captures an image including the iris of the subject at a timing synchronized with the guidance. In this way, the image acquisition unit 113 acquires an iris image of the subject. The timing synchronized with the guidance in step S103 may be, for example, a time when the subject moves the head sufficiently upward in accordance with the guidance. Alternatively, the timing may be a time when the subject moves the head sufficiently upward according to the guidance and then stops the head. Further, the timing may be shifted by a predetermined time from these time points.

In step S104, the feature amount generation unit 114 extracts a feature amount from the acquired iris image, thereby generating a feature amount of the iris of the subject. For example, it is possible to employ an algorithm called a Daugman's algorithm for the feature amount extraction processing, but other algorithms may be employed. The generated feature amount is transmitted from the iris image acquisition apparatus 1 to the matching server 2 by the I/F unit 115.

In step S105, the matching unit 212 compares the feature amount of the subject acquired from the iris image acquisition apparatus 1 via the I/F unit 211 with the feature amount of the registrant stored in advance in the feature amount storage unit 213, and determines whether or not the subject and the registrant are the same person. The matching process may be, for example, a process of calculating a matching score based on a degree of matching between two feature amounts, and determining that the subject and the registrant are the same person when the matching score is equal to or greater than a threshold value. The matching process performed by the matching unit 212 may be one-to-one matching in which the feature amount of the subject is compared with the feature amount of one registrant, or may be one-to-N matching in which the feature amount of the subject is compared with the feature amounts of a plurality of registrants. In the one-to-N matching, it is determined whether anyone of the plurality of registrants and the subject are the same person or whether the subject is not included in the registrants.

In step S106, the matching unit 212 outputs the matching result to the iris image acquisition apparatus 1 via the I/F unit 211. The iris image acquisition apparatus 1 notifies the user of the matching result. The notification of the matching result may be, for example, that the display control unit 112 controls the display device 108 to display a message or the like indicating the matching result. Further, the matching result may be used for controlling a device such as opening and closing a passage gate in accordance with the matching result. By the above-described processing, the iris matching system of this example embodiment can perform iris matching of the subject and notify the result.

With reference to FIGS. 7A, 7B, 8A, and 8B, an effect obtained by performing a process of guiding the subject to move the head while gazing at a predetermined position in step S101 will be described.

Figure 7A:
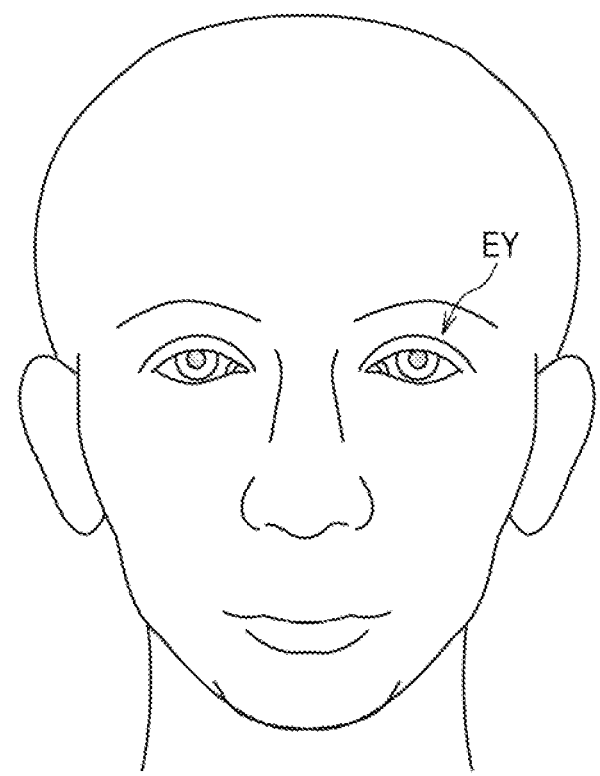
FIG. 7A is a schematic diagram showing an example of an image when a subject faces forward.
Figure 7B:
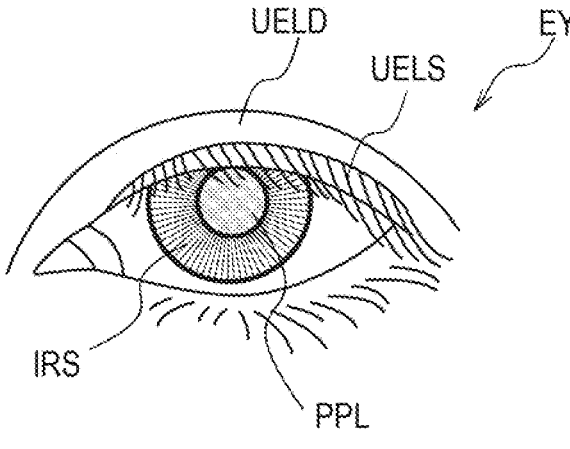
FIG. 7B is an enlarged view of an eye in the example of the image when the subject faces forward.

FIG. 7A is a schematic diagram showing an example of an image when the subject faces forward. FIG. 7B is an enlarged view of an eye EY in the example of the image when the subject faces forward. FIG. 7B shows an iris IRS, a pupil PPL, an upper eyelid UELD, upper eyelashes UELS, and the like included in the eye EY of the subject. As shown in FIG. 7B, wide range of the upper side of the iris IRS is covered by the upper eyelid UELD or the upper eyelashes UELS, and the pattern cannot be discriminated, so that the range cannot be used for iris matching. Therefore, if an area covered by the upper eyelid UELD or the upper eyelashes UELS is large, the accuracy of iris matching may not be sufficiently obtained.

Figure 8A:
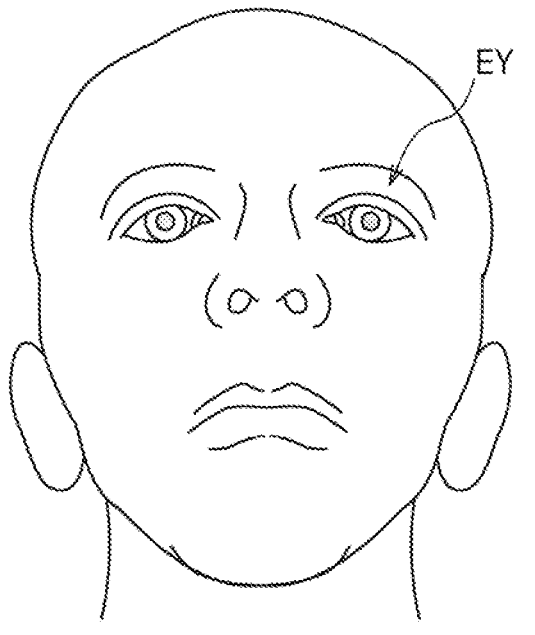
FIG. 8A is a schematic diagram showing an example of an image when the subject moves the head upward while gazing forward.
Figure 8B:
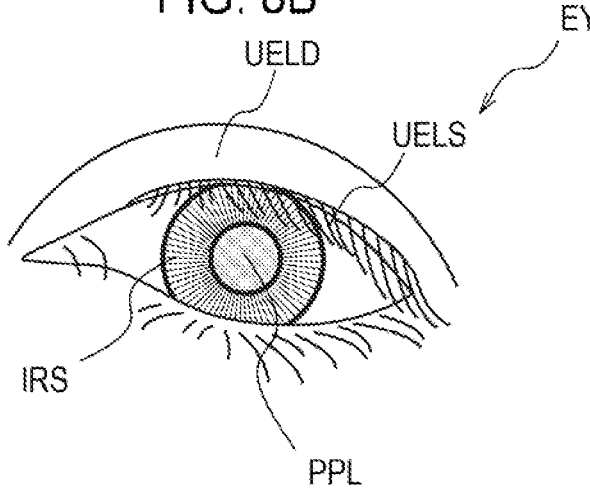
FIG. 8B is an enlarged view of an eye in the example of the image when the subject moves the head upward while gazing forward.

FIG. 8A is a schematic diagram showing an example of an image when the subject moves the head upward while gazing forward. FIG. 8B is an enlarged view of the eye EY in the example of the image when the subject moves the head upward while gazing forward. When the head is moved upward while gazing forward, the position of the upper eyelid UELD does not change much, and the pupil PPL moves downward. Therefore, as shown in FIG. 8B, a range in which the iris IRS is covered by the upper eyelid UELD or the upper eyelashes UELS decreases. Here, "moving the head upward" indicates that the head is moved so that the face faces upward as shown in FIG. 8B, and this operation can also be expressed as "moving the neck upward", "tilting the head upward", "turning the face upward", "shaking the head upward", "backbending the head", "raising the chin", and the like. Hereinafter, the operation shown in FIG. 8B is expressed as "moving the head upward".

Therefore, according to this example embodiment, there is provided an information acquisition apparatus capable of further reducing the influence of covering of the iris by the eyelid or the like. Further, according to this example embodiment, there is provided an iris matching system in which deterioration of matching accuracy due to covering of the iris by the eyelid or the like is reduced. The iris matching system of this example embodiment is effective in improving the accuracy of iris matching of a subject who tends to cover and hide a part of the iris on the eyelid, the eyelashes or the like, such as a person whose eyes are narrow or a person whose upper eyelid position is lowered by ptosis.

In the processing of step S101, instead of the method of guiding the subject to move the head while gazing at the predetermined position, a method of guiding the subject to move a position where the subject is gazed without moving the head may be applied, but the method of moving the head of this example embodiment is more effective. In the method of moving the position where the head subject is gazed, in order to photograph the upper side of the iris as in FIGS. 8A and 8B, it is necessary to guide the subject to move the pupil PPL downward. In this case, since the upper eyelid moves downward together with the movement of the eyeball rotating downward, there is little change in the positional relationship between the upper eyelid and the iris. Therefore, the effect of reducing the range in which the iris IRS is covered by the upper eyelid UELD or the upper eyelashes UELS cannot be obtained. Therefore, it is desirable to employ a method of guiding the subject to move the head while gazing at a predetermined position in this example embodiment.

Specific examples of the method of synchronizing the guidance and the photographing in step S103 include the following. First, the imaging device 107 or another camera sequentially acquires moving images, continuous images, and the like of the subject, and the imaging device 107 captures an image for iris matching when it is confirmed by still image analysis, moving image analysis, or the like that the subject has moved the head upward.

As another example, the imaging device 107 performs photographing after a predetermined time has elapsed after the message is displayed on the display device 108. The predetermined time is set in consideration of a time during which the subject reads the message and a time during which the subject moves the head.

As yet another example, when the subject moves the head sufficiently upward, the subject or a user other than the subject operates the operation device 106 of the iris image acquisition apparatus 1 to manually instruct photographing. In this example, a message that prompts the subject or the user to perform a photographing operation such as "press the button when the head is moved upward" may be additionally displayed on the display device 108.

As yet another example, the imaging device 107 sequentially acquires a moving image, a continuous image, and the like of the subject, and extracts an image at a time point when it is confirmed by image analysis that the subject has sufficiently moved the head upward from the moving image, the continuous image, and the like to acquire an image for iris matching.

In this example embodiment, an example has been described in which the subject is guided to move the head mainly upward, but the head may be moved in other directions. The guiding direction may be, for example, diagonally upward, lateral, diagonally downward, downward, or the like. In particular, in the case of guiding to downward, the lower side of the iris is likely to be exposed in contrast to the case of moving upward, and the iris information of this portion can be more reliably acquired.

Second Example Embodiment

Hereinafter, a second example embodiment will be described. Since this example embodiment is a modified example of the first example embodiment, description of elements similar to those of the first example embodiment may be omitted or simplified.

Figure 9:
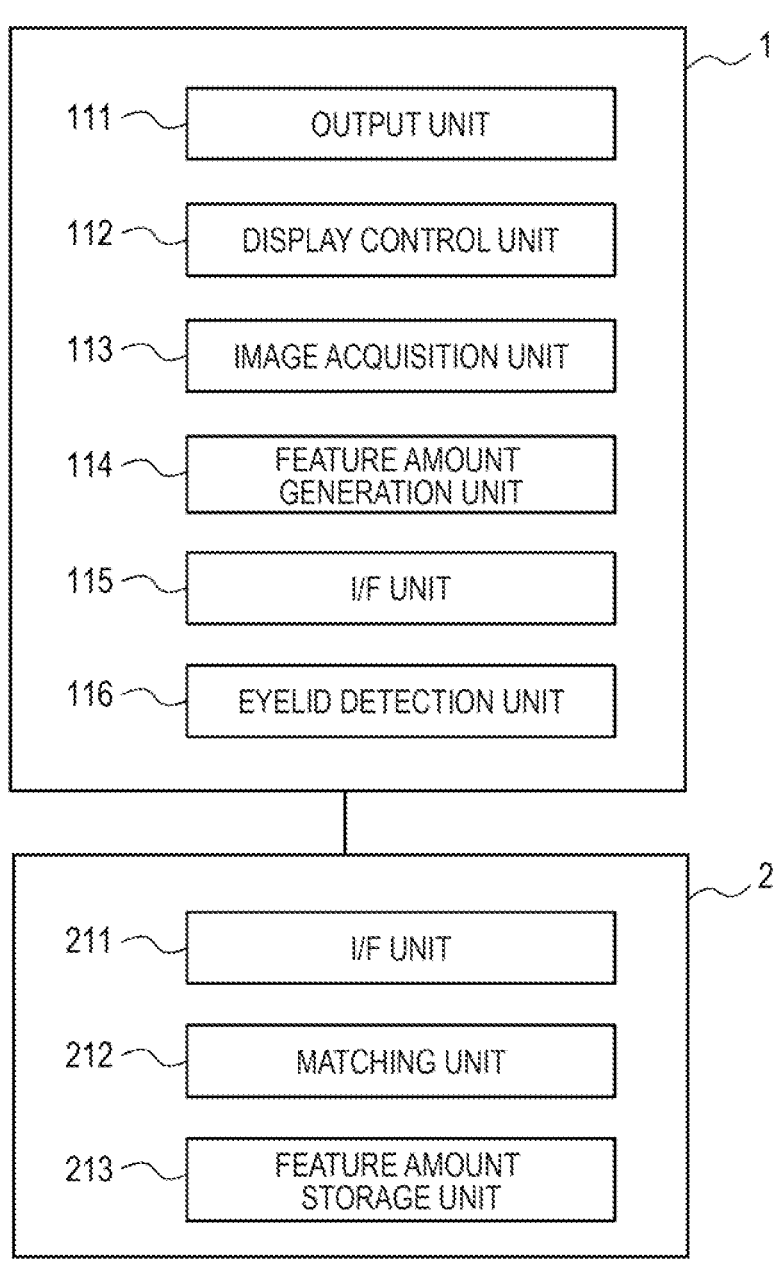
FIG. 9 is a functional block diagram of an iris matching system according to a second example embodiment.

FIG. 9 is a functional block diagram of the iris matching system according to this example embodiment. The iris image acquisition apparatus 1 of this example embodiment further includes an eyelid detection unit 116 in addition to the configuration of the first example embodiment. The processor 101 functions as the eyelid detection unit 116 by loading a program stored in the ROM 103, the HDD 104, or the like into the RAM 102 and executing the program. The eyelid detection unit 116 may be more generally referred to as an eyelid detection means.

Figure 10:
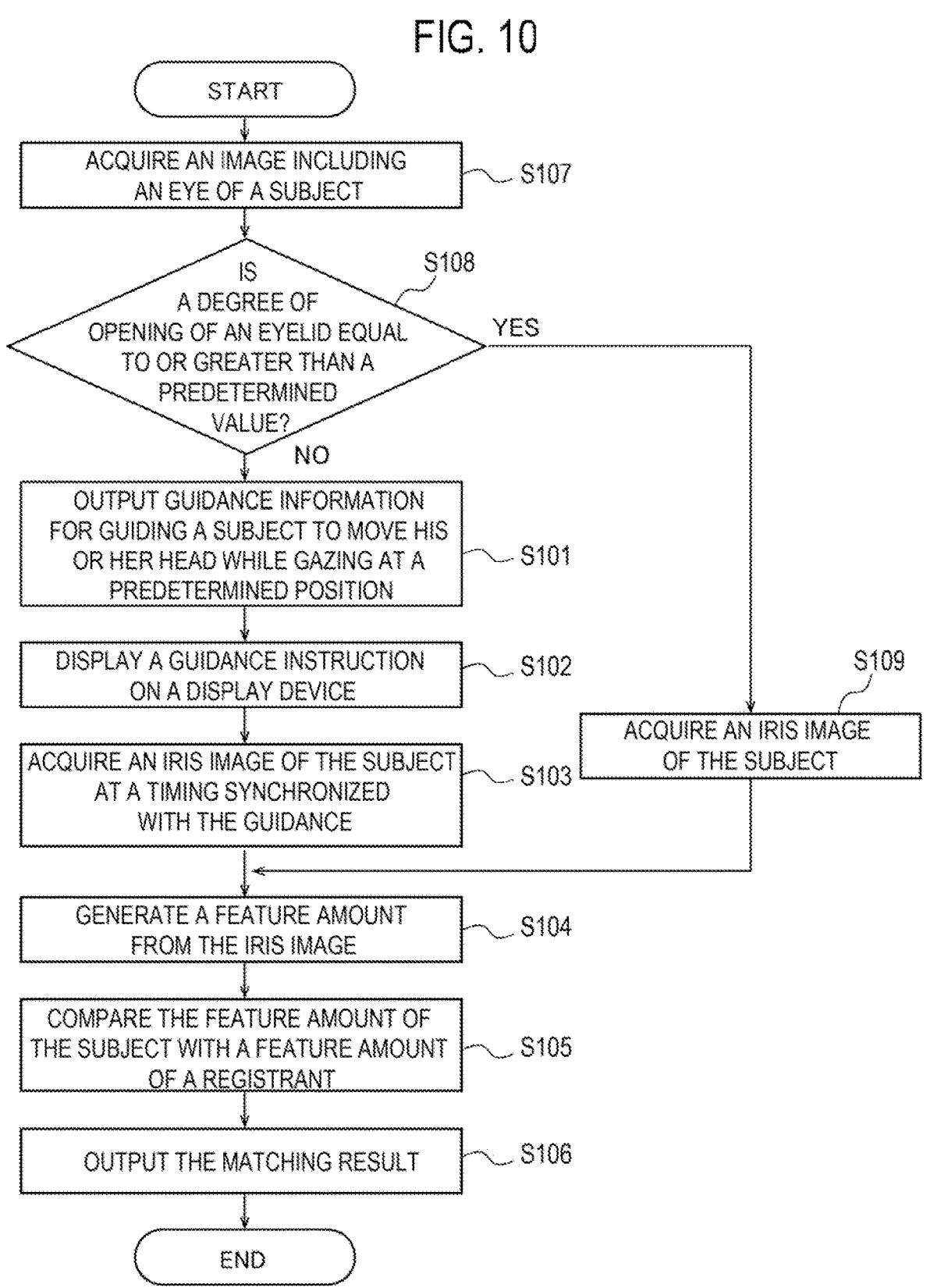
FIG. 10 is a flowchart showing an outline of a matching process performed in the iris matching system according to the second example embodiment.

FIG. 10 is a flowchart showing an outline of a matching process performed in the iris matching system according to this example embodiment. In step S107, the image acquisition unit 113 controls the imaging device 107 to capture an image including the eye of the subject. In this way, the image acquisition unit 113 obtains an image including the eye of the subject. The image including the eye may be the same as the iris image described in the description of step S103 of the first example embodiment, or may have a lower resolution than the iris image described above.

In step S108, the eyelid detection unit 116 detects a degree of opening of the eyelid of the subject based on the image including the eye of the subject obtained in step S107, and determines whether or not the degree of opening of the eyelid is equal to or greater than a predetermined value. When the degree of opening of the eyelid is equal to or greater than the predetermined value (YES in step S108), the process proceeds to step S109. When the degree of opening of the eyelid is less than the predetermined value (NO in step S108), the process proceeds to step S101.

Specific examples of the method of detecting the degree of opening of the eyelid include the following. First, the position of the eye of the subject is detected from the image, and parameters such as the length of the eye in the vertical direction, the aspect ratio of the eye, and the area of the eye are used as the degree of opening of the eyelid. As another example, the iris in the eye is detected from the image, and a parameter such as the shape or area of the iris is used as the degree of opening of the eyelid. As yet another example, the pupil and the upper eyelid in the eye is detected from the image, and a parameter such as a distance between the pupil and the upper eyelid is used as the degree of opening of the eyelid. The above-described length, area, distance, and the like may be based on the number of pixels. Alternatively, the above-described length, area, distance, and the like may be a value normalized by the diameter (width in the lateral direction) of the iris or the length between the outer corner of the eye and the inner corner of the eye. Further, not only one image but also a plurality of images captured in a time series may be used for determination. This makes it possible to distinguish between the case where the eyes are temporarily closed due to blinking and the case where the eyes are originally narrow.

In step S109, the image acquisition unit 113 controls the imaging device 107 to capture an image including the iris of the subject. In this way, the image acquisition unit 113 acquires an iris image of the subject. After acquiring the iris image, the process proceeds to step S104. Since the processing in steps S101 to S106 is similar to that in the first example embodiment, the description thereof will be omitted.

As described above, in this example embodiment, when the degree of opening of the eyelid is not sufficient, the guidance instruction of steps S101 and S102 is performed, and when the degree of opening of the eyelid is sufficient, the guidance instruction of steps S101 and S102 is omitted, and the iris image is captured. As a result, the same effect as in the first example embodiment may be obtained, and in addition, when the guidance instruction is unnecessary, this can be omitted to speed up the matching process. Further, when the guidance instruction is unnecessary, it is not necessary to give the guidance instruction to the subject, so that convenience of the iris image acquisition apparatus 1 is improved.

When it is possible to acquire an iris image having a resolution sufficient for iris matching in step S107 and the degree of opening of the eyelid is equal to or greater than a predetermined value in step S108, the processing in step S109 may be omitted. In this case, in step S104, the iris image acquired in step S107 is used.

Third Example Embodiment

Hereinafter, a third example embodiment will be described. Since this example embodiment is a modified example of the first example embodiment, description of elements similar to those of the first example embodiment may be omitted or simplified.

Figure 11:
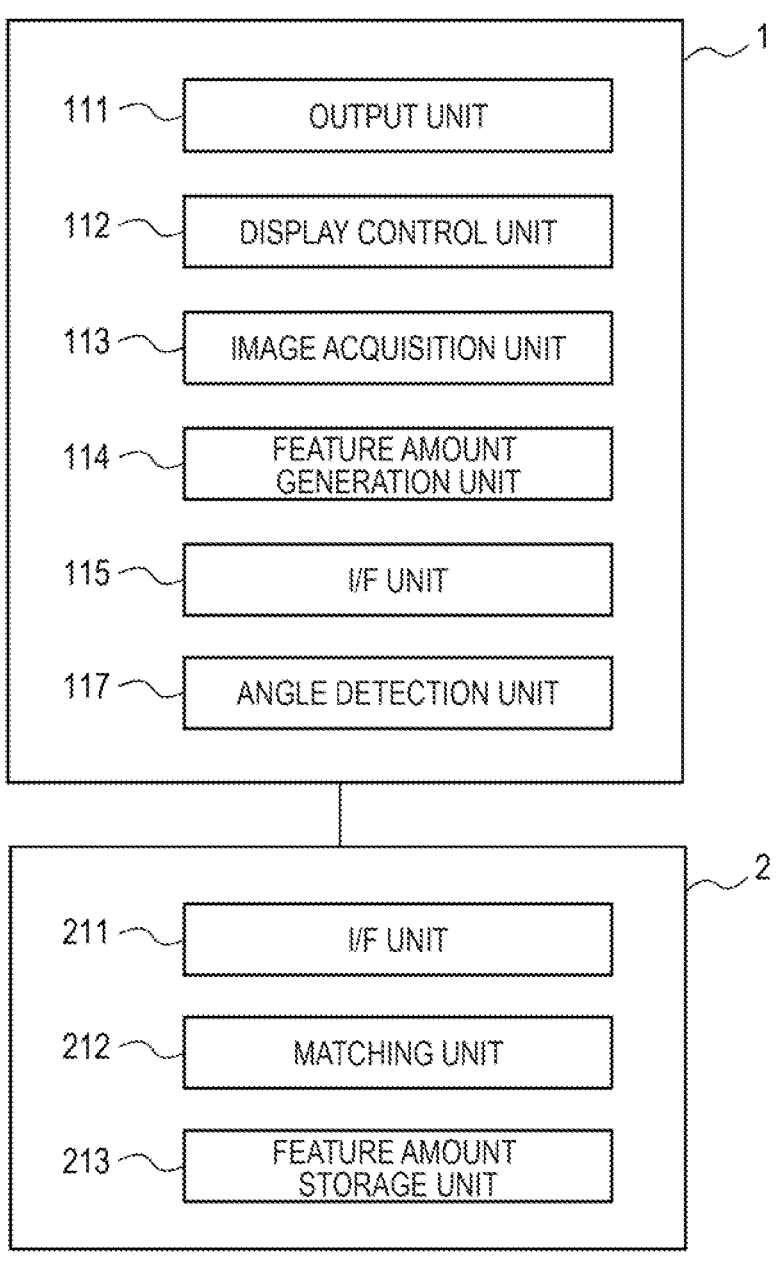
FIG. 11 is a functional block diagram of an iris matching system according to a third example embodiment.

FIG. 11 is a functional block diagram of the iris matching system according to this example embodiment. The iris image acquisition apparatus 1 of this example embodiment further includes an angle detection unit 117 in addition to the configuration of the first example embodiment. The processor 101 functions as an angle detection unit 117 by loading a program stored in the ROM 103, the HDD 104, or the like into the RAM 102 and executing the program. The angle detection unit 117 may be more generally referred to as an angle detection means.

Figure 12:
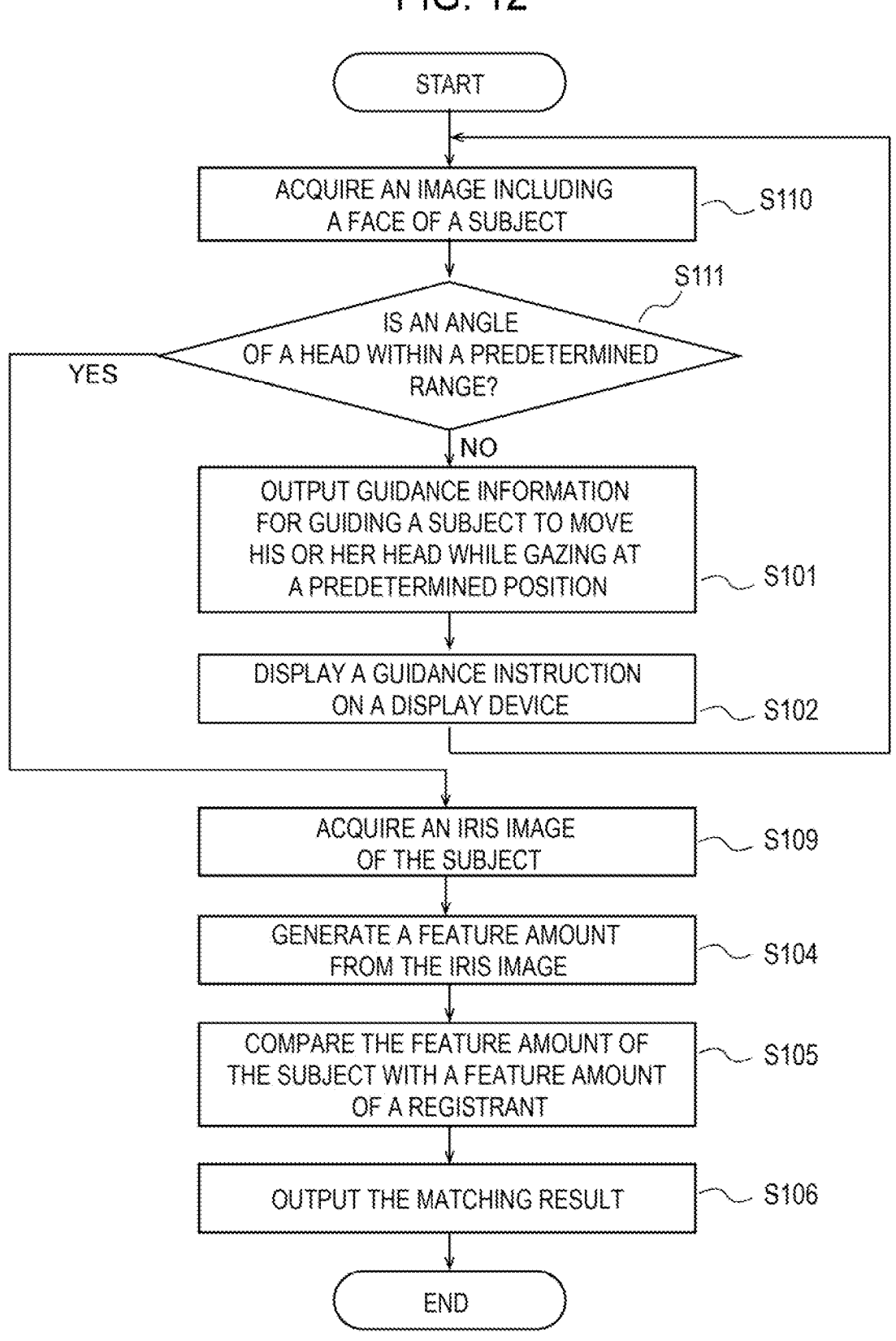
FIG. 12 is a flowchart showing an outline of a matching process performed in the iris matching system according to the third example embodiment.

FIG. 12 is a flowchart showing an outline of a matching process performed in the iris matching system according to this example embodiment. In step S110, the image acquisition unit 113 controls the imaging device 107 to capture an image including the face of the subject. In this way, the image acquisition unit 113 obtains an image including the face of the subject. The resolution of the image including the face may be similar to that of the iris image described in the description of step S103 of the first example embodiment, or may be lower than that of the iris image described above.

In step S111, the angle detection unit 117 detects an angle of the head of the subject based on the image including the face of the subject obtained in step S110, and determines whether or not the angle of the head is within a predetermined range. When the angle of the head is within the predetermined range (YES in step S111), the process proceeds to step S109. When the angle of the head is out of the predetermined range (NO in step S111), the process proceeds to step S101. Here, the "angle of the head" refers to, for example, an elevation angle in the direction in which the face of the subject faces, but can also be expressed as "angle of the face", "head angle with respect to horizontal direction", "angle of the neck", or the like. Hereinafter, the angle is referred to as "angle of the head".

As a specific example of the method of detecting the angle of the head, the angle of the head is detected by estimating a face direction from the image including the face of the subject and performing processing such as addition or subtraction of a predetermined value to the face direction. Further, the angle of the head may be directly detected from a shape of the contour of the face, coordinates of the feature points, and the like without performing the estimation of the face direction. Instead of the face angle, the face direction may be used. In this case, similarly to the angle, it is determined whether or not the face direction is within a predetermined range.

In addition, the above-described predetermined range may be a range of angles which are higher than the forward direction and suitable for photographing the upper portion of the iris. On the contrary, the above-described predetermined range may be a range of angles which are lower than the forward direction and suitable for photographing the lower portion of the iris.

Since the processing in steps S101 and S102 is similar to that in the first example embodiment, the description thereof will be omitted. After step S102, the process proceeds to step S110, and the angle of the head is estimated again.

In step S109, the image acquisition unit 113 controls the imaging device 107 to capture an image including the iris of the subject. In this way, the image acquisition unit 113 acquires the iris image of the subject. After acquiring the iris image, the process proceeds to step S104. Since the processing in steps S104 to S106 is similar to that in the first example embodiment, the description thereof will be omitted.

As described above, in this example embodiment, the iris image is captured after detecting that the angle of the head is within the predetermined range. Thus, the same effect as in the first example embodiment may be obtained, and in addition, an iris image suitable for iris matching may be acquired more reliably.

Fourth Example Embodiment

Hereinafter, a fourth example embodiment will be described. Since this example embodiment is a modified example of the third example embodiment, description of elements similar to those of the third example embodiment may be omitted or simplified.

Figure 13:
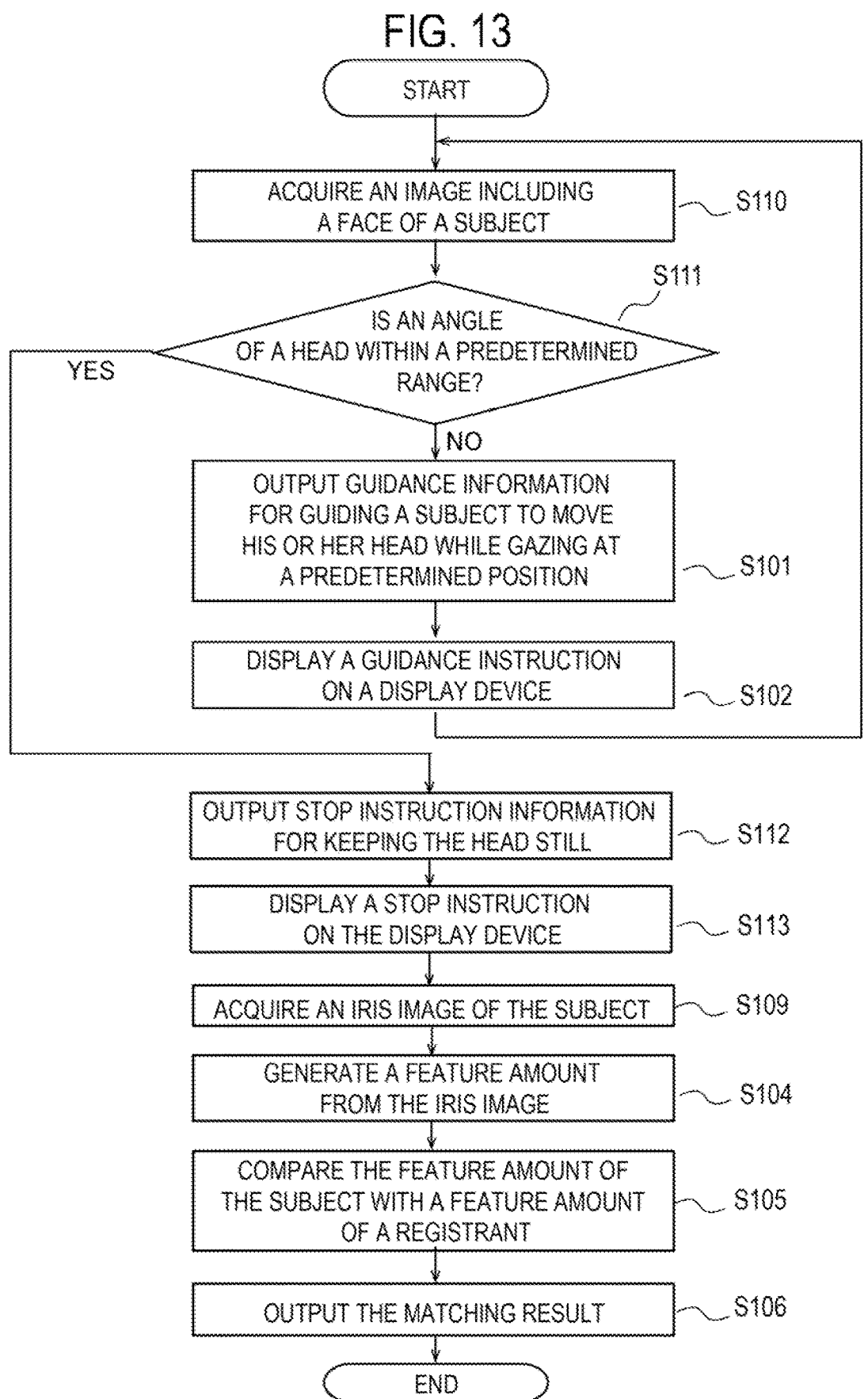
FIG. 13 is a flowchart showing an outline of a matching process performed in an iris matching system according to a fourth example embodiment.

FIG. 13 is a flowchart showing an outline of a matching process performed in the iris matching system according to this example embodiment. In steps S110 and S111, the head angle detection process is performed in the same manner as in the third example embodiment. When the angle of the head is within the predetermined range (YES in step S111), the process proceeds to step S112. When the angle of the head is out of the predetermined range (NO in step S111), the process proceeds to step S101. The processing in the case where the angle of the head is out of the predetermined range is the same as that in the third example embodiment, and thus description thereof is omitted.

In step S112, the output unit 111 outputs stop instruction information for instructing the subject to keep the head still. The stop instruction information may be, for example, display information for displaying a message, an image, or the like on the display device 108 for prompting the subject to keep the head still.

In step S113, the display control unit 112 controls the display device 108 based on the stop instruction information. Thus, the display device 108 displays an instruction for the subject to keep the head still.

Figure 14:
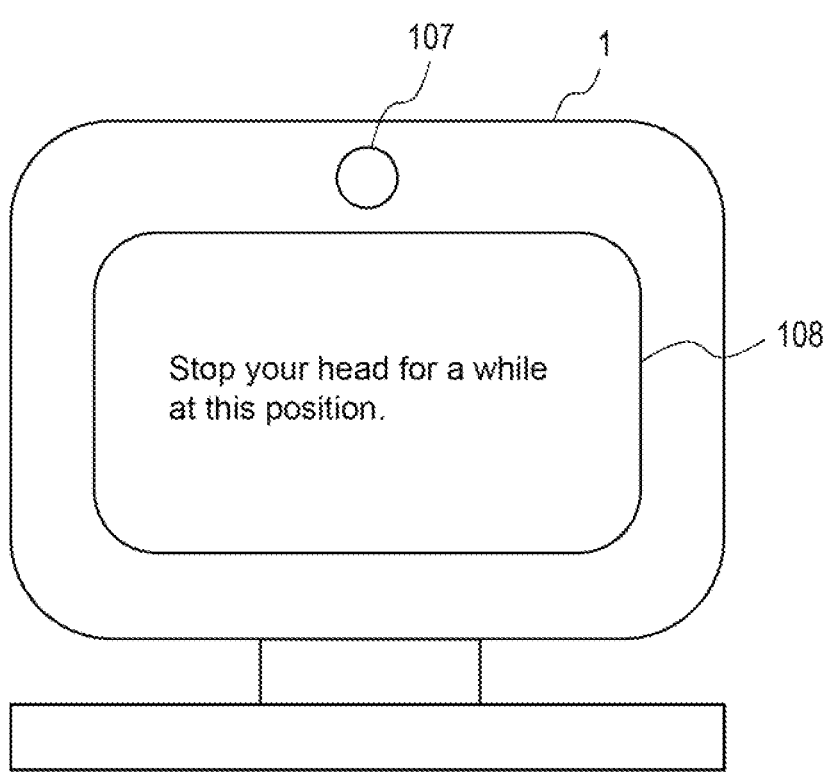
FIG. 14 shows an example of a stop instruction displayed on a display device in the matching process according to the fourth example embodiment.

FIG. 14 shows an example of a stop instruction displayed on the display device 108 in the matching process according to this example embodiment. The display device 108 displays a message "Stop your head for a while at this position." under the control of the display control unit 112. The subject reads this message and keep the head still. After step S113, the process proceeds to step S109.

In step S109, the image acquisition unit 113 controls the imaging device 107 to capture an image including the iris of the subject. In this way, the image acquisition unit 113 acquires the iris image of the subject. After acquiring the iris image, the process proceeds to step S104. Since the processing in steps S104 to S106 is similar to that in the first example embodiment, the description thereof will be omitted.

As described above, in this example embodiment, when it is detected that the angle of the head is within the predetermined range, the subject is instructed to keep the head still, and then the iris image is captured. As a result, the same effect as in the third example embodiment may be obtained, and in addition, since the iris is captured in a state in which the head is still, it is possible to acquire an iris image having high image quality in which a subject blur of the image is reduced.

Fifth Example Embodiment

Hereinafter, a fifth example embodiment will be described. Since this example embodiment is a modified example of the fourth example embodiment, description of elements similar to those of the fourth example embodiment may be omitted or simplified.

Figure 15:
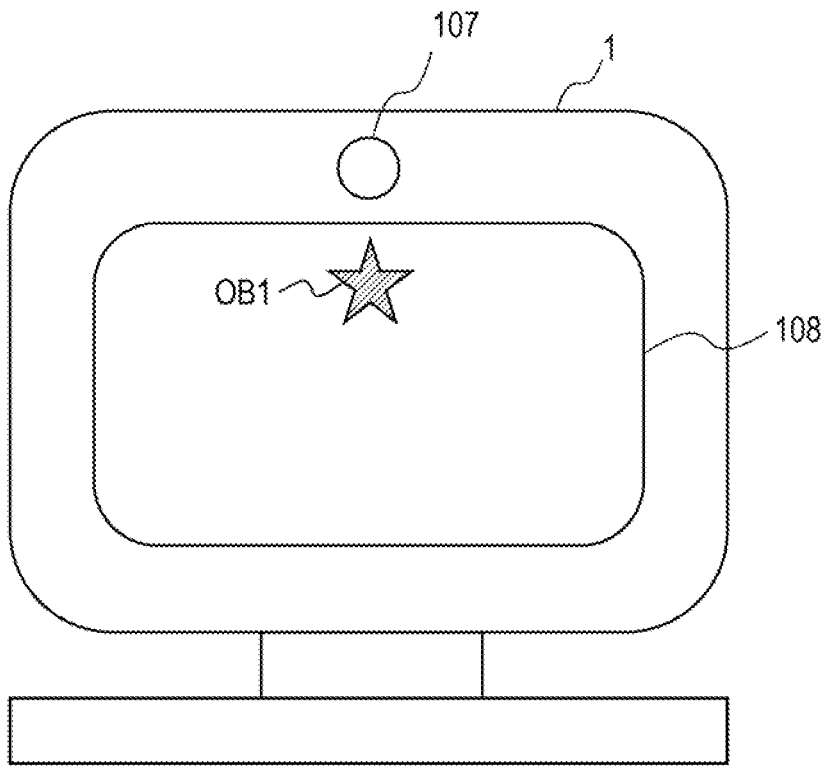
FIG. 15 shows an example of a stop instruction displayed on a display device in the matching process according to a fifth example embodiment.

FIG. 15 shows an example of a stop instruction displayed on the display device 108 in the matching process according to this example embodiment. Before reaching step S112, the display device 108 displays a star-shaped object OB1. At this point, the color of the star-shaped object OB1 is red. The subject reads the message and moves the head while looking at the object OB1. When the stop instruction information is output in step S112, the color of the object OB1 displayed on the display device 108 changes from red to green in step S113. The subject sees this color change and keep the head still.

In this example embodiment, the same effect as in the fourth example embodiment may be obtained, and in addition, a user interface capable of notifying the user of whether or not the angle of the head is appropriate by a more intuitive and easy-to-understand stile is realized. Note that the shape of the object OB1, the mode of change of the display state, and the like are not limited to those shown in FIG. 15. For example, the shape and/or color of symbols such as circles, X marks, and check marks may be changed. The color of the entire screen of the display device 108, the outer frame of the screen, or the like may be changed. The color of the characters of the message may be changed. In step S102, the display device 108 may display a message "Move your head up and down while looking at the star. When the star changes from red to green, stop your head for a while at that position." in accordance with the control of the display control unit 112. This makes it easy for the user to understand the meaning of the object OB1.

Note that the user interface that detects whether or not the angle of the head is appropriate and outputs information indicating this as shown in the fourth and fifth example embodiments is not necessarily limited to that used in combination with the processing in steps S101 and S102. For example, the process of guiding the subject to move the head may be omitted. The displayed information may also include information indicating a degree of inclination, such as how much inclination is required to the predetermined angle. For example, when the angle of the head at a certain time point is slightly lower than the predetermined angle, a text indicating the degree of inclination may be included in the guidance message, such as "Tilt your head slightly upward". Alternatively, instead of representing the degree in language, other means may be used to represent the degree. For example, the message may blink so that the message blinks quickly when the angle deviates largely from a predetermined angle, and the message blinks slowly when the deviation decreases, thereby indicating the degree. Alternatively, the color of the message may be changed to indicate the degree. Alternatively, the brightness at which the message is displayed may be changed according to the degree. The object blinking or changing color is not limited to the message itself, and may be a background of the message or a frame surrounding the message.

Sixth Example Embodiment

Hereinafter, a sixth example embodiment will be described. Since this example embodiment is a modified example of the fourth example embodiment, description of elements similar to those of the first example embodiment may be omitted or simplified.

Figure 16:
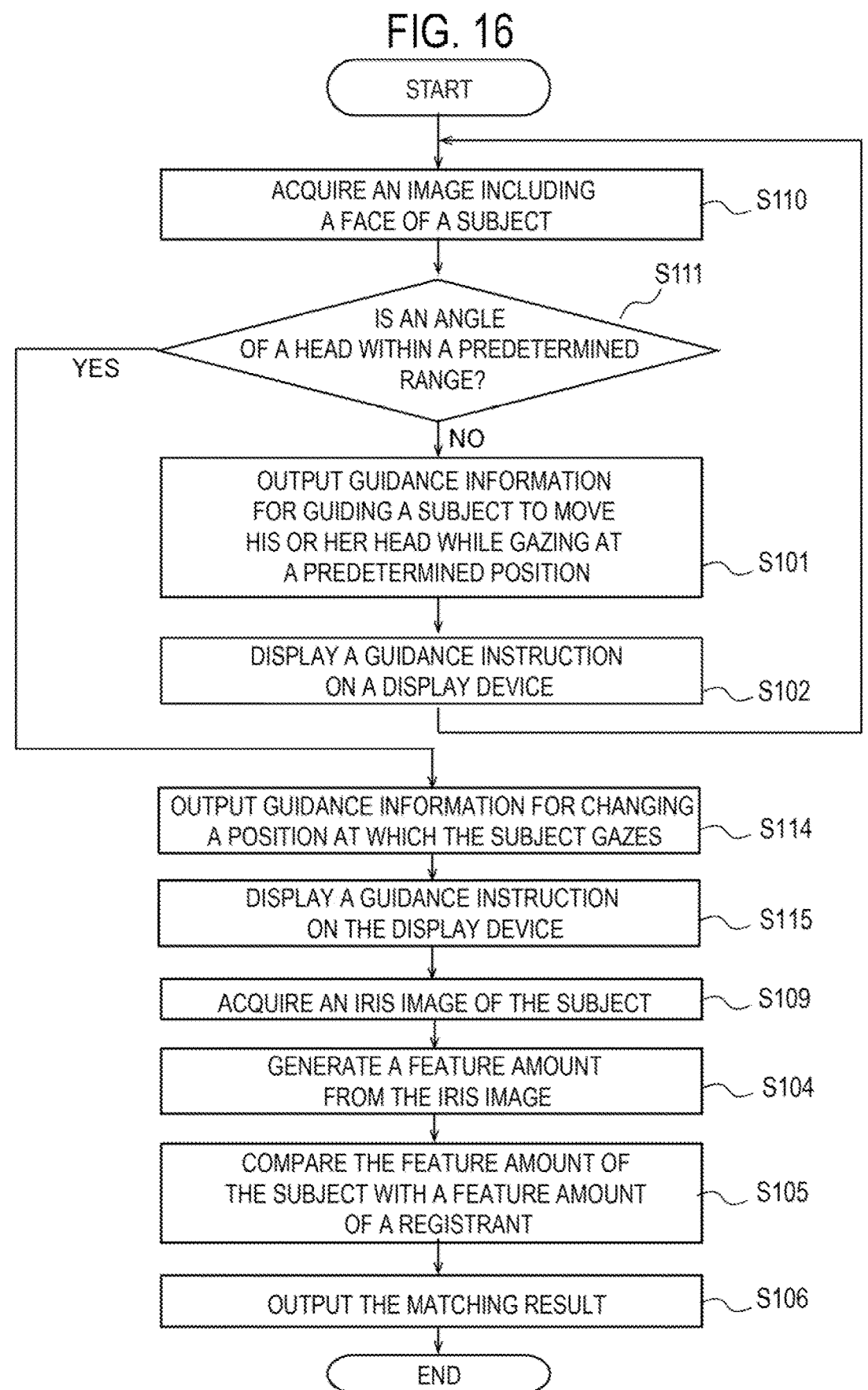
FIG. 16 is a flowchart showing an outline of a matching process performed in an iris matching system according to a sixth example embodiment.

FIG. 16 is a flowchart showing an outline of a matching process performed in the iris matching system according to this example embodiment.

In step S114, the output unit 111 outputs guidance information for guiding the subject to change the position at which the subject gazes. The guidance information may be, for example, display information for displaying a message, an image, or the like that prompts the user to move a line of sight on the display device 108.

In step S115, the display control unit 112 controls the display device 108 based on the guidance information. Thereby, the display device 108 displays an instruction to guide the subject to change a position at which the subject gazes.

Figure 17:
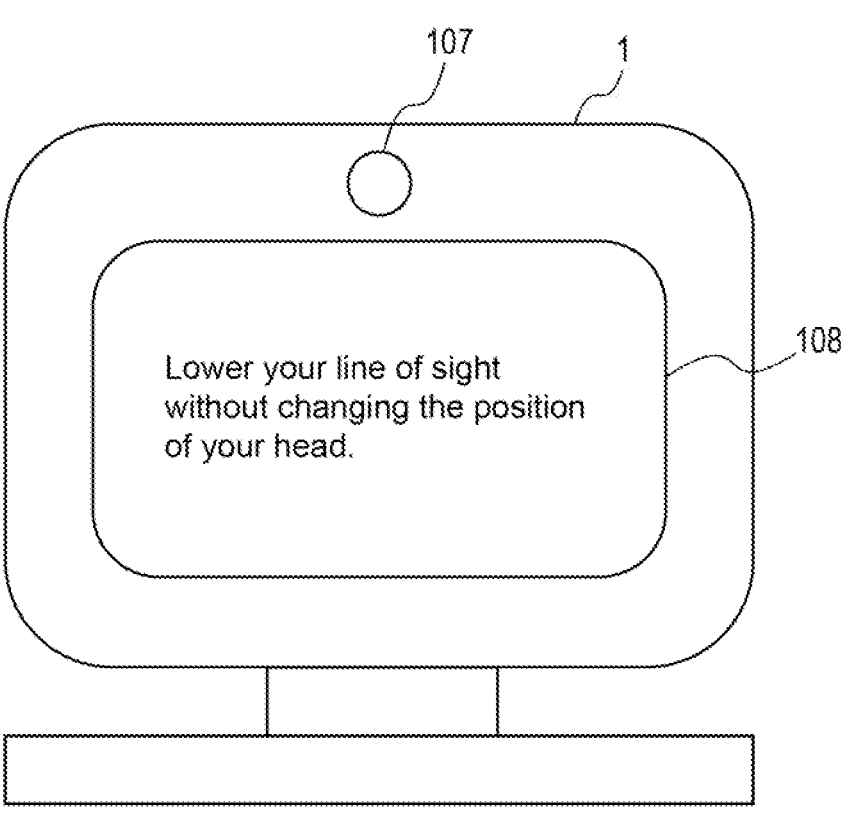
FIG. 17 shows an example of a guidance instruction displayed on a display device in the matching process according to the sixth example embodiment.

FIG. 17 shows an example of a stop instruction displayed on the display device 108 in the matching process according to this example embodiment. In accordance with the control of the display control unit 112, the display device 108 displays "Lower your line of sight without changing the position of your head.". The subject reads this message and lowers the line of sight with the position of the head kept unchanged. After step S113, the process proceeds to step S109.

In step S109, the image acquisition unit 113 controls the imaging device 107 to capture an image including the iris of the subject. In this way, the image acquisition unit 113 acquires the iris image of the subject. After acquiring the iris image, the process proceeds to step S104. Since the processing in steps S104 to S106 is similar to that in the first example embodiment, the description thereof will be omitted.

As described above, in this example embodiment, when it is detected that the angle of the head is within the predetermined range, the subject is instructed to change the position at which the subject gazes without changing the position of the head, and then the iris image is captured. Thus, the same effect as in the fourth example embodiment may be obtained, and in addition, the iris is imaged in a state in which the line of sight is moved. Thereby, it is possible to acquire the iris image in a state in which the region of the iris not covered by the eyelid or the like is further changed. For example, if an instruction to lower the line of sight is issued as shown in FIG. 17, the eyeball is rotated downward, and the upper portion of the iris is less likely to be covered with the eyelid or the like, so that the imaging of the upper portion of the iris is effective.

Seventh Example Embodiment

Hereinafter, a seventh example embodiment will be described. Since this example embodiment is a modified example of the first example embodiment, description of elements similar to those of the first example embodiment may be omitted or simplified.

FIG. 18 is a flowchart showing an outline of a matching process performed in the iris matching system according to this example embodiment. In this example embodiment, the processing from step S101 to step S103 are loop processing performed a plurality of times. In this loop processing, the guidance of steps S101 and S102 is performed so that the angle of the head varies for each processing cycle when photographing the iris image in step S103. Thus, a plurality of iris images with different angles of the head can be acquired. As a specific example of the plurality of iris images, at least two iris images when the head is raised and when the head is lowered are acquired. When the acquisition of the predetermined kind or number of iris images is completed, the loop processing ends, and the process proceeds to step S104. Since the subsequent processing of steps S104 to S106 is substantially the same as those of the first example embodiment, the description thereof will be omitted.

Figure 19:
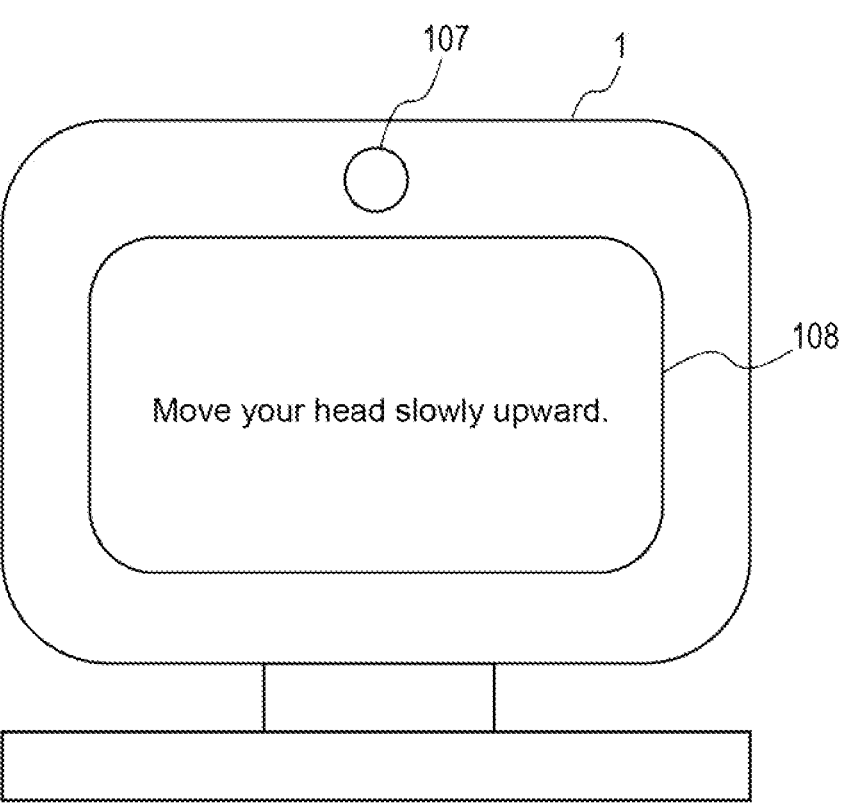
FIG. 19 shows an example of a guidance instruction displayed on a display device in the matching process according to the seventh example embodiment.

FIG. 19 shows an example of a guide display displayed on the display device 108 during the matching process according to this example embodiment. The display device 108 displays a message "Move your head slowly upward" under the control of the display control unit 112. This message may change every cycle of the loop from step S101 to step S103. For example, when an iris image is captured for the first time, "Move your head slowly upward" is displayed, and when an iris image is captured for the second time, "Move your head slowly downward" is displayed, whereby guidance is realized in which the subject moves the head up and down.

The effect of obtaining the plurality of iris images with different angles of the head will be described. As shown in FIG. 8B, when an iris image is captured with the head of the subject raised, the upper side of the iris is less likely to be covered by the upper eyelid or the upper eyelashes, but instead, the lower side of the iris is likely to be covered by the lower eyelid or the lower eyelashes. On the other hand, as shown in FIG. 7B, when the subject is in a state where the head is straightened or lowered, the upper side of the iris is likely to be covered by the upper eyelid or the upper eyelashes, but the lower side of the iris is less likely to be covered by the lower eyelid or the lower eyelashes. Accordingly, the range in which the iris is covered with the eyelid or the like may vary depending on the angle of the head. Thus, in this example embodiment, a plurality of iris images with different angles of the head are acquired. As a result, the same effect as in the first example embodiment may be obtained, and in addition, it is possible to acquire a plurality of iris images with different ranges covered by the eyelid or the like. By performing iris matching using the plurality of iris images, accuracy of iris matching is improved.

A message "Keep looking straight ahead and slowly move your head upward and downward in accordance with the guidance on the screen." may be displayed in addition to the message "Move your head slowly upward." This makes it easier for the subject to understand the meaning of the guidance instruction.

As an example of a matching method using a plurality of iris images, matching is performed on each of a plurality of feature amounts generated from the plurality of iris images. It is possible to determine whether or not the subject and the registrant are the same person by integrating the matching results. As a method of integrating the matching results, for example, a logical disjunction or logical conjunction of the matching results may be used as a final determination result, or a sum of scores obtained by each matching may be used for determining a final determination result.

Eighth Example Embodiment

Hereinafter, an eighth example embodiment will be described. Since this example embodiment is a modified example of the seventh example embodiment, description of elements similar to those of the seventh example embodiment may be omitted or simplified.

FIG. 20 is a flowchart showing an outline of a matching process performed in the iris matching system according to this example embodiment. In this example embodiment, step S116 is added to the loop processing from step S101 to step S103. In this example embodiment, the guidance information includes information indicating an area in which the iris image of the subject has been acquired. In step S116, the display control unit 112 controls the display device 108 based on the guidance information. Thus, the display device 108 displays information indicating the area in which the iris image has been captured in addition to the guidance instruction for guiding the subject to move the head while gazing at a predetermined position.

Figure 21:
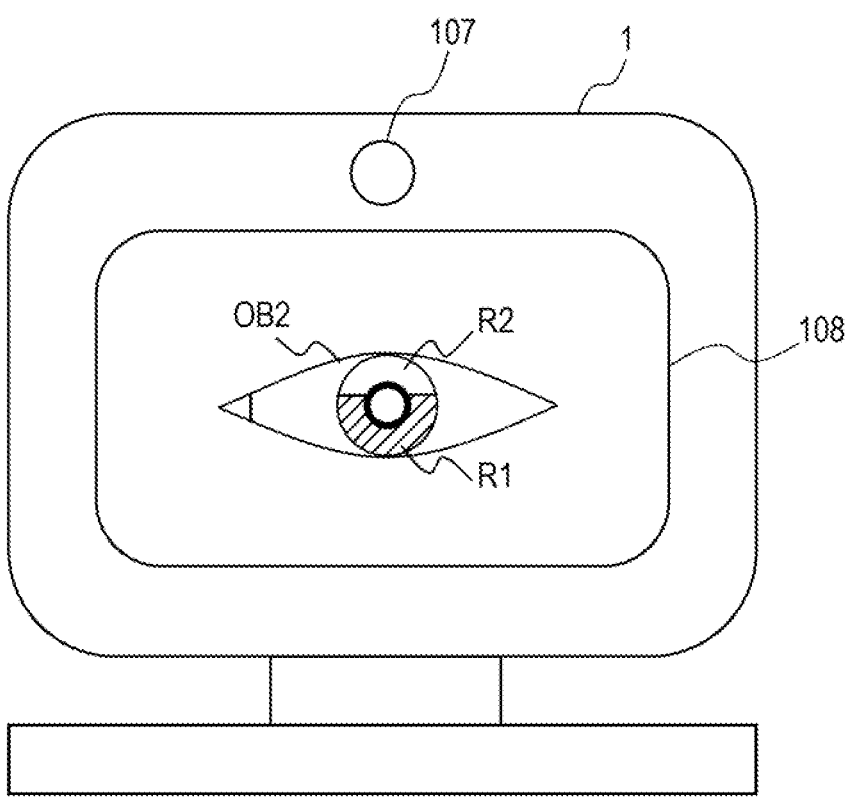
FIG. 21 shows an example of a guidance instruction displayed on a display device in the matching process according to the eighth example embodiment.

FIG. 21 shows an example of a guidance display displayed on the display device 108 during the matching process according to this example embodiment. The display device 108 displays a schematic diagram showing an area in which an iris image has been acquired under the control of the display control unit 112. This schematic diagram includes an object OB2 including an annular region simulating an iris, and the object OB2 includes a colored region R1 and a non-colored region R2. The colored region R1 indicates a region in which an iris image not covered with the eyelid or the like has already been acquired, and the non-colored region R2 indicates a region in which an iris image not covered with the eyelid or the like has not been acquired.

While looking at the object OB2, the subject moves the head up and down while confirming that the colored range of the object OB2 is widened. The subject can know the range in which the iris image has been acquired, and can move the head while confirming that the photographing progresses. Thus, the same effect as in the seventh example embodiment may be obtained, and in addition, a plurality of iris images can be captured more smoothly.

Note that, for example, a guidance message indicating "Move your head up and down until the iris is fully colored." may be displayed together with the object OB2. This makes it easy for the subject to understand what the object OB2 means.

Instead of the object OB2 shown in FIG. 21, the display device 108 may further display a message, an object, and the like indicating a direction of moving the head. Alternatively, the display device 108 may display both the object OB2 shown in FIG. 21 and a message, an object, and the like indicating the direction of moving the head. Thus, the subject can more clearly understand which direction the head should be moved.

Ninth Example Embodiment

The ninth example embodiment will be described below. Since this example embodiment is a modified example of the seventh example embodiment, description of elements similar to those of the seventh example embodiment may be omitted or simplified.

FIG. 22 is a flowchart showing an outline of a matching process performed in the iris matching system according to this example embodiment. In this example embodiment, step S117 is added after the feature amount is generated for each of the plurality of iris images captured in step S104.

In step S117, the feature amount generation unit 114 performs processing of synthesizing the feature amounts extracted from the plurality of iris images in step S104 to generate a feature amount for iris matching.

Figure 23:
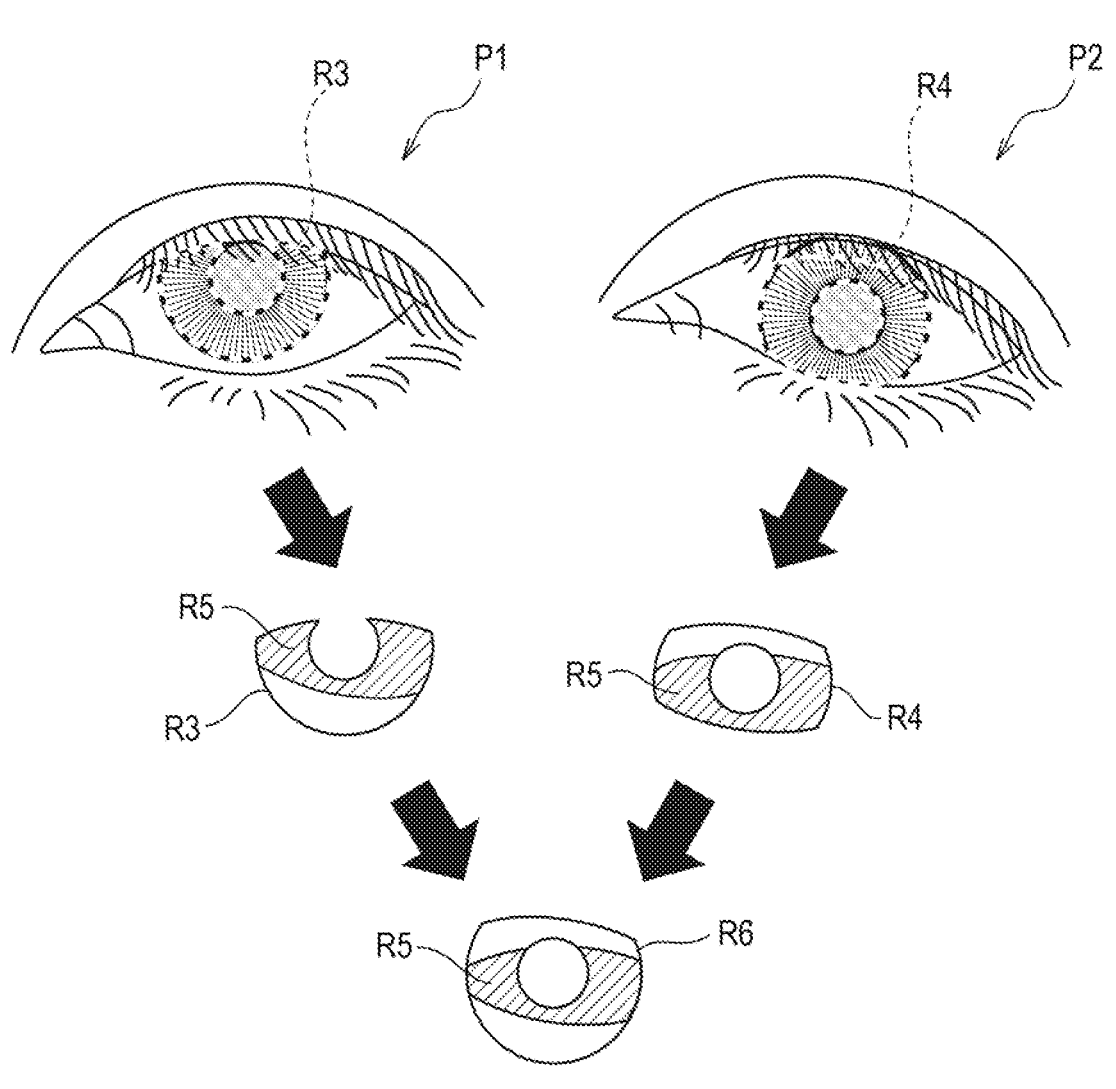
FIG. 23 is a schematic diagram showing an outline of feature amount synthesis processing performed in an iris matching system according to the ninth example embodiment.

An example of the processing in step S117 will be described with reference to FIG. 23. FIG. 23 is a schematic diagram showing an outline of feature amount synthesis processing performed in the iris matching system of this example embodiment. First, feature amounts are extracted from an iris region R3 of an iris image P1 when the subject faces forward and an iris region R4 of an iris image P2 when the subject moves the head upward while gazing forward. The iris region R3 and the iris region R4 are different regions depending on the difference in the range covered by the eyelid or the like. However, the iris region R3 and the iris region R4 have a common region R5. Since the iris image P1 and the iris image P2 are acquired from the same person, the feature amounts extracted from the common region R5 are substantially the same between the iris image P1 and the iris image P2 except for a difference due to noise or the like.

Thus, the iris region R3 and the iris region R4 are aligned and superimposed using a part or all of the feature amounts extracted from the common region R5. This alignment may include processing such as translation, enlargement, reduction, and rotation. A region obtained by superposition is a synthesized region R6 in FIG. 23. By combining the feature amount of the iris region R3 and the feature amount of the iris region R4, the feature amount of the synthesized region R6 can be generated. For a region in which only one of the feature amount of the iris region R3 and the feature amount of the iris region R4 can be extracted (that is, a region outside the common region R5), the one feature amount is directly adopted as the feature amount of the synthesized region R6. For the feature amount of the common region R5, either one of the feature amount of the iris region R3 and the feature amount of the iris region R4 may be adopted as the feature amount of the synthesized region R6, or both may be adopted as the feature amount of the synthesized region R6. As another example, the feature amount of the common region R5 may be an average of the feature amount of the iris region R3 and the feature amount of the iris region R4. As yet another example, the feature amount may be extracted after synthesizing the images instead of synthesizing the feature amounts after extracting the feature amounts. That is, when a pixel value exists only in one of the iris region R3 and the iris region R4, the pixel value may be used as it is, and in the synthesized region R6, either one of the pixel values of the iris region R3 and the iris region R4 may be used, or the pixel value may be calculated by combining the two. Then, the feature amount of the iris may be extracted from the obtained synthesized image.

According to this example embodiment, the same effect as in the seventh example embodiment may be obtained, and in addition, by using two iris images, it is possible to generate feature amounts from a wide range of the iris. Thereby, it is possible to realize the iris matching with higher accuracy.

Note that the processing of synthesizing feature amounts as shown in the ninth example embodiment is not necessarily limited to the processing used in combination with the processing of steps S101 and S102. For example, the process of guiding the subject to move the head may be omitted.

The apparatuses or systems described in the above example embodiments can also be configured as in the tenth to twenty-ninth example embodiments.

Tenth Example Embodiment

Figure 24:
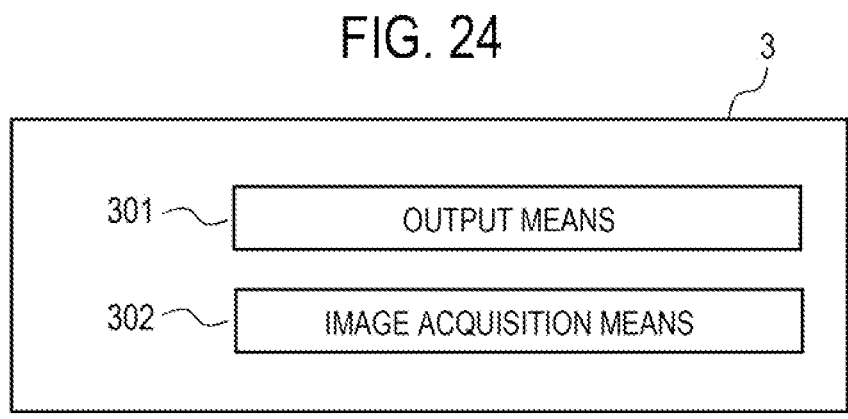
FIG. 24 is a functional block diagram of an information acquisition apparatus according to a tenth example embodiment.

FIG. 24 is a functional block diagram of the information acquisition apparatus 3 according to the tenth example embodiment. The information acquisition apparatus 3 includes an output means 301 and an image acquisition means 302. The output means 301 outputs guidance information for guiding the subject to move the head while gazing at a predetermined position. The image acquisition means 302 acquires an image including the iris of the subject after outputting the guidance information.

According to this example embodiment, there is provided the information acquisition apparatus 3 capable of further reducing the influence caused by covering and hiding the iris by the eyelid or the like.

Eleventh Example Embodiment

The information acquisition apparatus 3 according to this example embodiment has the following configuration in addition to the configuration of the tenth example embodiment. The guidance information of this example embodiment includes information for guiding the subject to move the head upward.

According to this example embodiment, in addition to obtaining the effect of the tenth example embodiment, there is provided the information acquisition apparatus 3 capable of further reducing the influence caused by covering the upper side of the iris by the eyelid or the like.

Twelfth Example Embodiment

The information acquisition apparatus 3 according to this example embodiment has the following configuration in addition to the configuration of the tenth example embodiment or the eleventh example embodiment. The image acquisition means 302 of this example embodiment acquires a plurality of images having different angles of the head of the subject.

According to this example embodiment, in addition to obtaining the effect of the tenth example embodiment or the eleventh example embodiment, there is provided the information acquisition apparatus 3 capable of obtaining a plurality of iris images in which the range covered by the eyelid or the like is different from each other.

Thirteenth Example Embodiment

Figure 25:
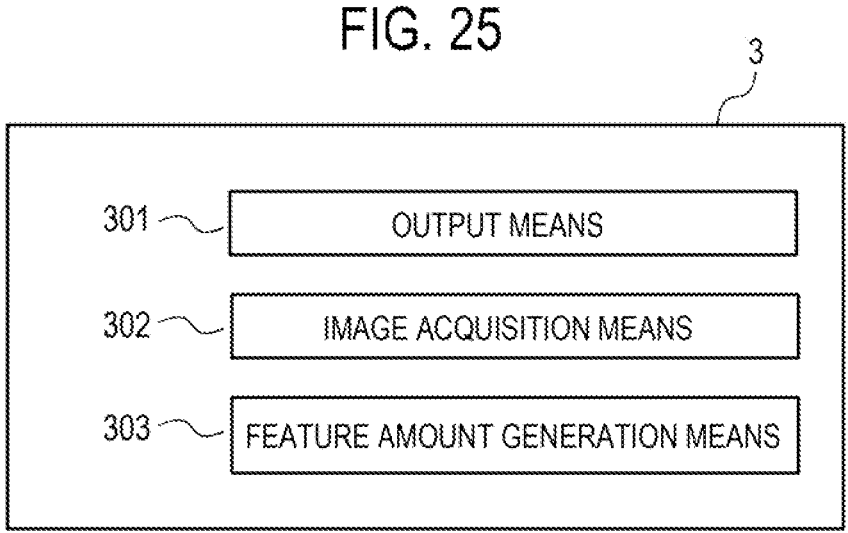
FIG. 25 is a functional block diagram of an information acquisition apparatus according to a thirteenth example embodiment.

FIG. 25 is a functional block diagram of the information acquisition apparatus 3 according to the thirteenth example embodiment. The information acquisition apparatus 3 further includes a feature amount generation means 303 in addition to the information acquisition apparatus 3 of the twelfth example embodiment. The feature amount generation means 303 generates a plurality of feature amounts for iris matching by extracting a feature amount from each of the plurality of images.

According to this example embodiment, in addition to obtaining the effect of the twelfth example embodiment, there is provided the information acquisition apparatus 3 capable of obtaining a plurality of feature amounts based on a plurality of iris images whose areas covered by the eyelid or the like are different from each other.

Fourteenth Example Embodiment

Figure 26:
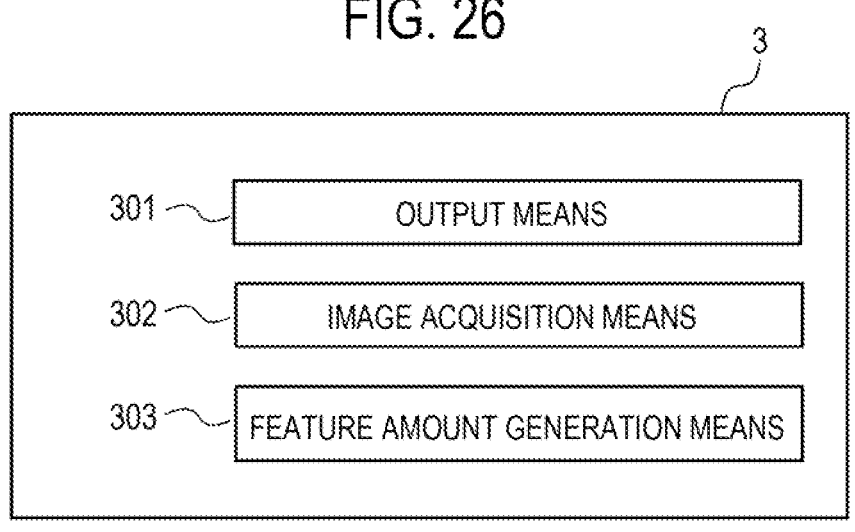
FIG. 26 is a functional block diagram of an information acquisition apparatus according to a fourteenth example embodiment.

FIG. 26 is a functional block diagram of the information acquisition apparatus 3 according to the fourteenth example embodiment. The information acquisition apparatus 3 further includes a feature amount generation means 303 in addition to the information acquisition apparatus 3 of the twelfth example embodiment. The feature amount generation means 303 generates a feature amount for iris matching by synthesizing feature amounts extracted from the plurality of images.

According to this example embodiment, in addition to obtaining the effect of the twelfth example embodiment, the information acquisition apparatus 3 capable of generating feature amounts from a wide range of iris is provided.

Fifteenth Example Embodiment

Figure 27:
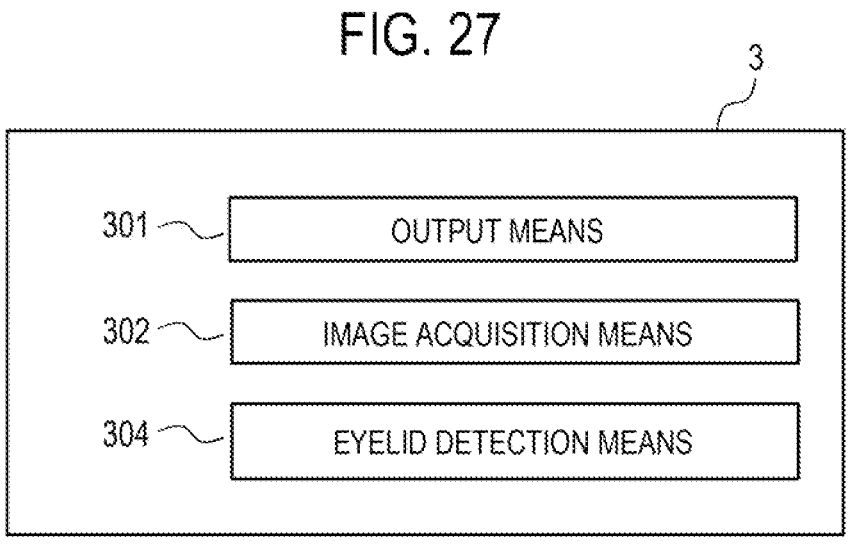
FIG. 27 is a functional block diagram of an information acquisition apparatus according to a fifteenth example embodiment.

FIG. 27 is a functional block diagram of the information acquisition apparatus 3 according to the fifteenth example embodiment. The information acquisition apparatus 3 further includes an eyelid detection means 304 in addition to the information acquisition apparatus 3 of any one of the tenth to fourteenth example embodiments. The eyelid detection means 304 detects a degree of opening of an eyelid of the subject.

According to this example embodiment, in addition to obtaining the effects of any one of the tenth to fourteenth example embodiments, the information acquisition apparatus 3 capable of obtaining information on the degree of opening of the eyelid is provided.

Sixteenth Example Embodiment

The information acquisition apparatus 3 according to this example embodiment has the following configuration in addition to the configuration of the fifteenth example embodiment. The output means 301 of this example embodiment outputs guidance information when the degree of opening of the eyelid detected by the eyelid detection means 304 is less than a predetermined value.

According to this example embodiment, in addition to obtaining the effect of the fifteenth example embodiment, it is possible to provide the information acquisition apparatus 3 capable of speeding up the matching process by omitting the guidance instruction when the guidance instruction is unnecessary.

Seventeenth Example Embodiment

Figure 28:
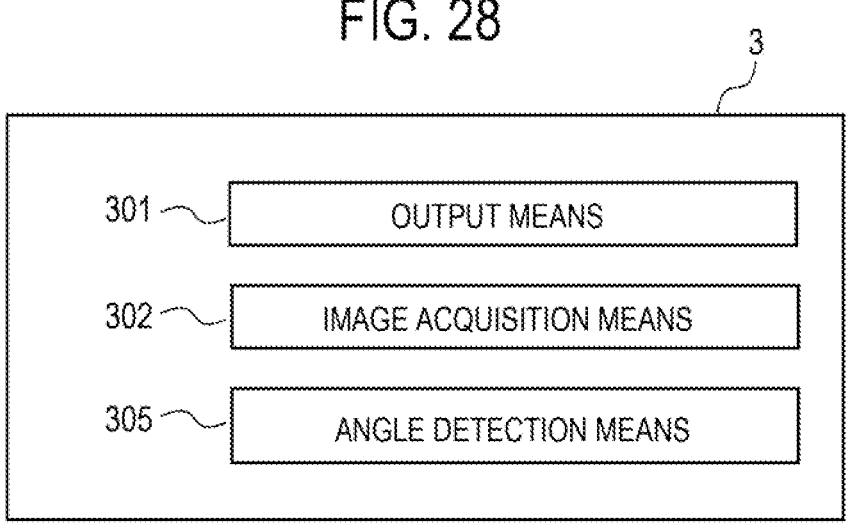
FIG. 28 is a functional block diagram of an information acquisition apparatus according to a seventeenth example embodiment.

FIG. 28 is a functional block diagram of the information acquisition apparatus 3 according to the seventeenth example embodiment. The information acquisition apparatus 3 further includes an angle detection means 305 in addition to the information acquisition apparatus 3 of any one of the tenth to sixteenth example embodiments. The angle detection means 305 detects the angle of the head of the subject.

According to this example embodiment, in addition to the effects of any one of the tenth to sixteenth example embodiments, the information acquisition apparatus 3 capable of obtaining information of the angle of the head is provided.

Eighteenth Example Embodiment

The information acquisition apparatus 3 according to this example embodiment has the following configuration in addition to the configuration of the seventeenth example embodiment. The guidance information of this example embodiment includes information indicating whether or not the angle of the head of the subject is appropriate for acquiring the image.

According to this example embodiment, in addition to obtaining the effect of the seventeenth example embodiment, the information acquisition apparatus 3 capable of obtaining information indicating whether the angle of the head is appropriate is provided.

Nineteenth Example Embodiment

The information acquisition apparatus 3 according to this example embodiment has the following configuration in addition to the configuration of the seventeenth example embodiment or the eighteenth example embodiment. The guidance information of this example embodiment includes information for guiding the subject to keep the head still when the angle of the head of the subject is appropriate for acquiring the image.

According to this example embodiment, in addition to obtaining the effect of the seventeenth example embodiment or the eighteenth example embodiment, the information acquisition apparatus 3 capable of acquiring a high-quality iris image in which subject blur of an image is reduced is provided.

Twentieth Example Embodiment

The information acquisition apparatus 3 according to this example embodiment has the following configuration in addition to the configuration of the nineteenth example embodiment. The guidance information of this example embodiment includes information for guiding the subject to move a line of sight while keeping the head still.

According to this example embodiment, in addition to obtaining the effect of the nineteenth example embodiment, there is provided the information acquisition apparatus 3 capable of obtaining the iris image in a state in which the region of the iris not covered with the eyelid or the like is further changed.

Twenty-First Example Embodiment

The information acquisition apparatus 3 according to this example embodiment has the following configuration in addition to the configuration of any one of the seventeenth to twentieth example embodiments. The output means 301 of this example embodiment changes a display of a display device when the angle of the head of the subject is appropriate for acquiring the image.

According to this example embodiment, in addition to obtaining the effects of any one of the seventeenth to twentieth example embodiments, the information acquisition apparatus 3 is provided which realizes a user interface capable of notifying a user of whether or not the angle of the head is appropriate by a more intuitive and easy-to-understand display.

Twenty-Second Example Embodiment

The information acquisition apparatus 3 according to this example embodiment has the following configuration in addition to the configuration of any one of the tenth to twenty-first example embodiments. The guidance information of this example embodiment includes information indicating a region of the iris of the subject in which an image has been captured.

According to this example embodiment, in addition to obtaining the effects of any one of the tenth to twenty-first example embodiments, there is provided the information acquisition apparatus 3 capable of moving the head while confirming that photographing is progressing, and capable of more smoothly capturing an iris image.

Twenty-Third Example Embodiment

The information acquisition apparatus 3 according to this example embodiment has the following configuration in addition to the configuration of any one of the tenth to twenty-second example embodiments. The output means 301 of this example embodiment causes a display device to display a message or an image prompting the subject to move the head.

According to this example embodiment, in addition to obtaining the effects of any one of the tenth to twenty-second example embodiments, the information acquisition apparatus 3 capable of communicating the guided information visually and easily is provided.

Twenty-Fourth Example Embodiment

The information acquisition apparatus 3 according to this example embodiment has the following configuration in addition to the configuration of any one of the tenth to twenty-third example embodiments. The output means 301 of this example embodiment causes an audio device to emit a sound prompting the subject to move the head.

According to this example embodiment, in addition to obtaining the effects of any one of the tenth to twenty-third example embodiments, there is provided the information acquisition apparatus 3 in which the movement of the line of sight is reduced by transmitting the guidance information by sound, and a more suitable iris image may be obtained.

Twenty-Fifth Example Embodiment

The information acquisition apparatus 3 according to this example embodiment has the following configuration in addition to the configuration of any one of the tenth to twenty-fourth example embodiments. The output means 301 of this example embodiment operates a guiding member so as to prompt the subject to move the head.

According to this example embodiment, in addition to the effects of any one of the tenth to twenty-fourth example embodiments, the information acquisition apparatus 3 capable of transmitting the instruction more easily is provided.

Twenty-Sixth Example Embodiment

The information acquisition apparatus 3 according to this example embodiment has the following configuration in addition to the configuration of any one of the tenth to twenty-fifth example embodiments. The output means 301 of this example embodiment causes a display device to display information indicating a place to be gazed by the subject.

According to this example embodiment, in addition to the effects of any one of the tenth to twenty-fifth example embodiments, there is provided the information acquisition apparatus 3 in which the movement of the line of sight is reduced and a more suitable iris image may be obtained.

Twenty-Seventh Example Embodiment

Figure 29:
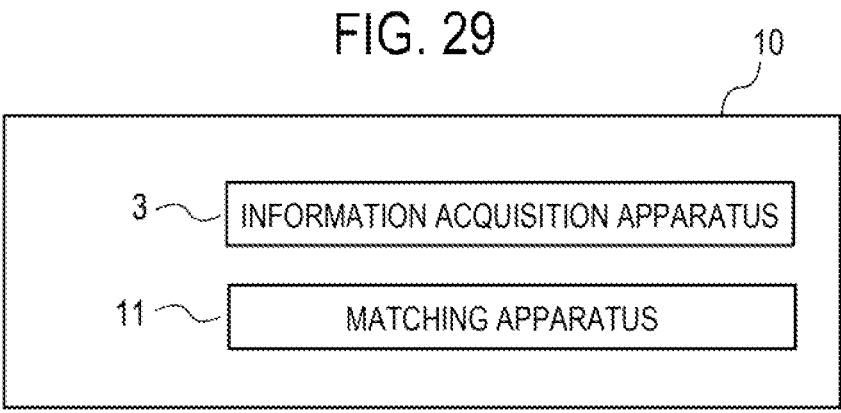
FIG. 29 is a functional block diagram of an information acquisition apparatus according to a twenty-seventh example embodiment.

FIG. 29 is a functional block diagram of the iris matching system 10 according to the twenty-seventh example embodiment. The iris matching system 10 includes an information acquisition apparatus 3 according to any one of the tenth to twenty-sixth example embodiments, and a matching apparatus 11 that performs matching based on an image acquired by the information acquisition apparatus 3.

According to this example embodiment, it is possible to provide an iris matching system 10 capable of realizing iris matching in which an influence caused by covering and hiding the iris by the eyelid or the like is further reduced.

Twenty-Eighth Example Embodiment

Figure 30:
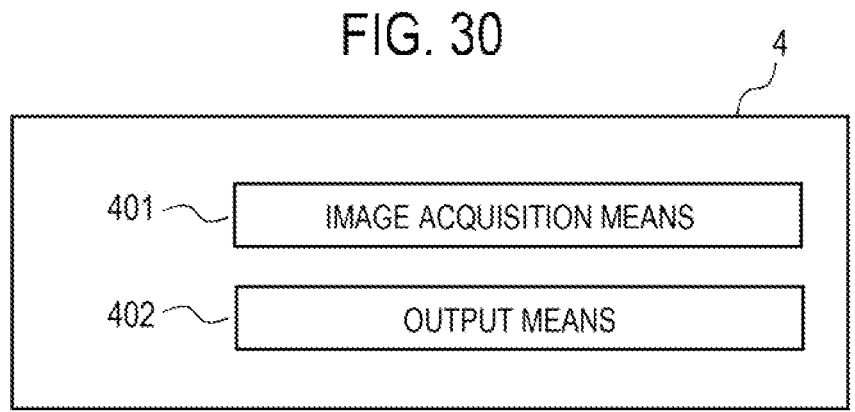
FIG. 30 is a functional block diagram of an information acquisition apparatus according to a twenty-eighth example embodiment.

FIG. 30 is a functional block diagram of the information acquisition apparatus 4 according to the twenty-eighth example embodiment. The information acquisition apparatus 4 includes an image acquisition means 401 and an output means 402. The image acquisition means 401 acquires an image including an iris of a subject. The output means 402 outputs information indicating whether or not an angle of a head of the subject is appropriate for acquiring the image.

According to this example embodiment, there is provided the information acquisition apparatus 4 capable of further reducing the influence caused by covering and hiding the iris by the eyelid or the like.

Twenty-Ninth Example Embodiment

Figure 31:
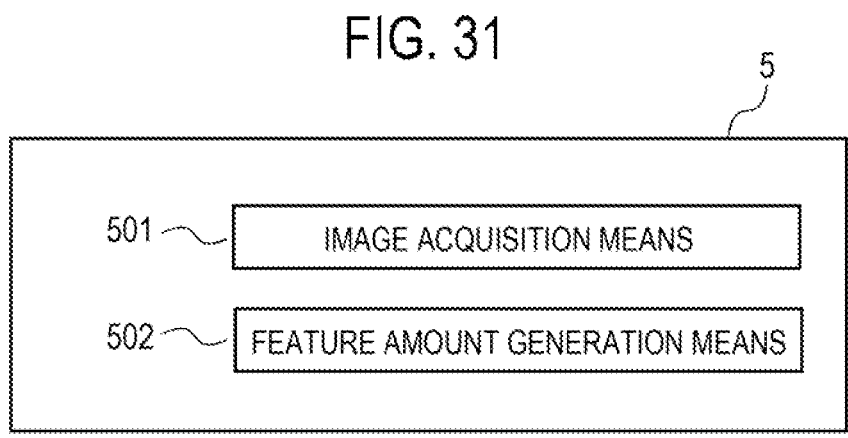
FIG. 31 is a functional block diagram of an information acquisition apparatus according to a twenty-ninth example embodiment.

FIG. 31 is a functional block diagram of the information acquisition apparatus 5 according to the twenty-ninth example embodiment. The information acquisition apparatus 5 includes an image acquisition means 501 and a feature amount generation means 502. The image acquisition means 501 acquires a plurality of images each including an iris of a subject. The feature amount generation means 502 generates a feature amount for iris matching by synthesizing feature amounts extracted from the plurality of images.

According to this example embodiment, there is provided the information acquisition apparatus 5 capable of further reducing the influence caused by covering the iris by the eyelid or the like.

Modified Example Embodiments

This disclosure is not limited to the above-described example embodiments, and can be appropriately modified without departing from the gist of this disclosure. For example, examples in which some of the configurations of any of the example embodiments are added to other example embodiments or examples in which some of the configurations of any of the example embodiments are replaced with some of the configurations of other example embodiments are example embodiments of this disclosure. Further, in this disclosure, the acquisition of iris information at the time of matching has been described, but guidance of this disclosure may be used in the acquisition of iris information for registration.

The display examples of the guidance instruction, the stop instruction, and the like in the above-described example embodiments are merely examples, and are not limited to the examples. Further, the presentation method of the guidance instruction, the stop instruction, and the like is not limited to the display on the display device 108.

For example, although FIG. 6 shows an example in which a message is displayed on the display device 108, a guidance instruction, a stop instruction, or the like may be issued by emitting a sound of the message from an audio device such as a speaker. In this manner, since the subject does not need to read the message, the movement of the line of sight which may occur due to the reading of the message or the like may be reduced, and a more suitable iris image may be obtained.

Figure 32:
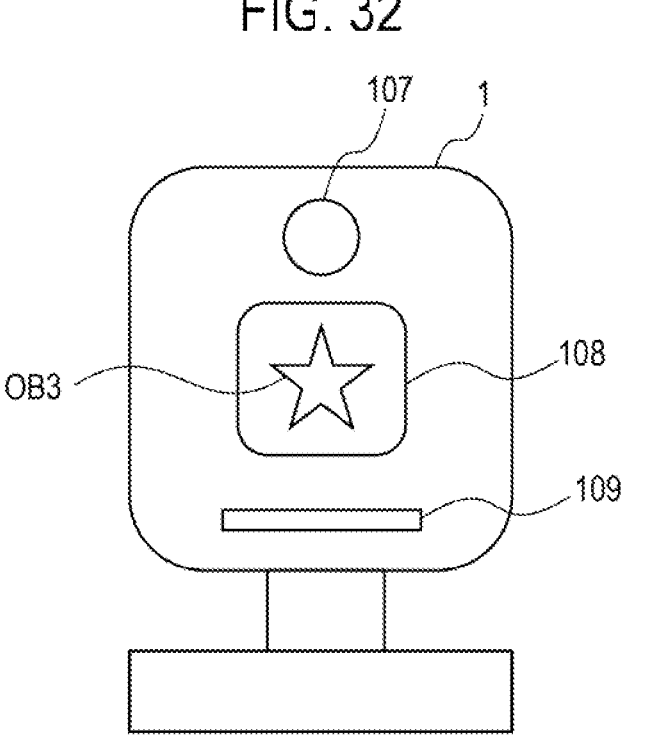
FIG. 32 is a diagram showing an example of a guidance instruction displayed on a display device in the matching process according to a modified example embodiment.

In addition, an audio device that emits a sound of a message and a display by the display device 108 may be combined. FIG. 32 shows an example of a guidance instruction displayed on the display device 108 in the matching process according to the modified example embodiment. The iris image acquisition apparatus 1 shown in FIG. 32 further includes an audio device 109 for emitting sound. An object OB3 for fixing the line of sight of the subject is displayed on the display device 108. In this state, by issuing a message such as "Move the head upward slowly while looking at the star on the screen." from the audio device 109, it is possible to notify the subject of an instruction to move the head while fixing the line of sight of the subject to the object OB3. This approach may yield more suitable iris images.

Figure 33:
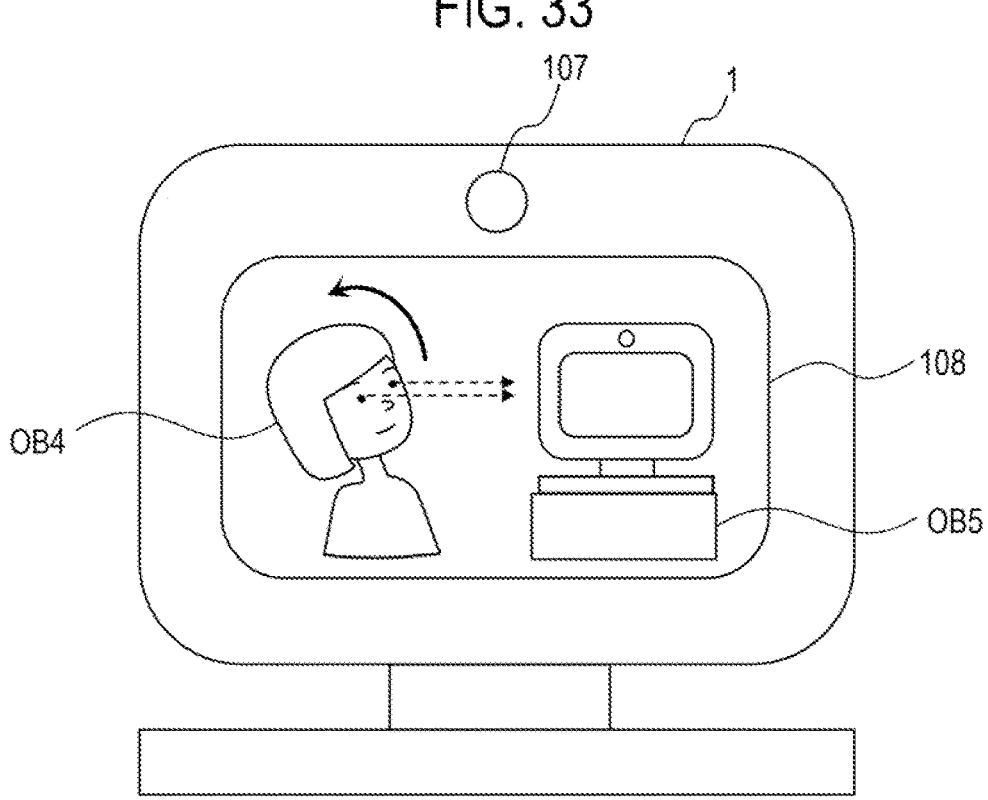
FIG. 33 is a diagram showing an example of a guidance instruction displayed on a display device in the matching process according to a modified example embodiment.

Further, in the case where a guidance instruction, a stop instruction, or the like is presented on the display device 108, this instruction may be presented not by characters but by graphics, symbols, illustrations, or the like. FIG. 33 shows an example of a guidance instruction displayed on the display device 108 in the matching process according to the modified example embodiment. On the display device 108, an object OB4 simulating the subject and an object OB5 simulating the iris image acquisition apparatus 1 are shown by illustration. The object OB4 indicates a state in which the subject performs an operation of moving the head while gazing at the iris image acquisition apparatus 1. This display may be a still image or a moving image. In this approach, an indication to the subject can be communicated more visually. In addition, graphics, symbols, illustrations, and the like have an advantage that they do not depend on language, unlike messages. Therefore, it is more effective in iris matching in a scene such as immigration which may be used by speakers of various languages.

In the example of FIG. 33, the object OB4 simulating the subject is an image displayed on the display device 108, but the object OB4 may be a physical guiding member instead of the image. As in the case of the object OB4, a guide member such as a doll simulating the subject may be disposed near the imaging device 107, and the guiding member may perform an operation of moving the head of the guide member in the same manner as in the case of the object OB4, thereby transmitting an instruction to the subject. In this method, an instruction to the subject can be transmitted more easily than the image.

In the above-described example embodiment, the influence of covering the iris by the eyelid, the eyelashes, or the like is reduced by moving the head, but an influence of other things obscuring the iris by other things may be reduced. For example, the iris may be covered by a frame of glasses, or the iris may be covered by a reflected image at a lens of glasses. In such a case as well, moving the head and changing the angle may reduce the effect of obscuring the iris. Instead of the angle detection of the third example embodiment, a process of detecting whether or not the subject is wearing glasses may be performed, and an instruction to guide the subject to move the head when the subject is wearing glasses may be performed.

Figure 34:
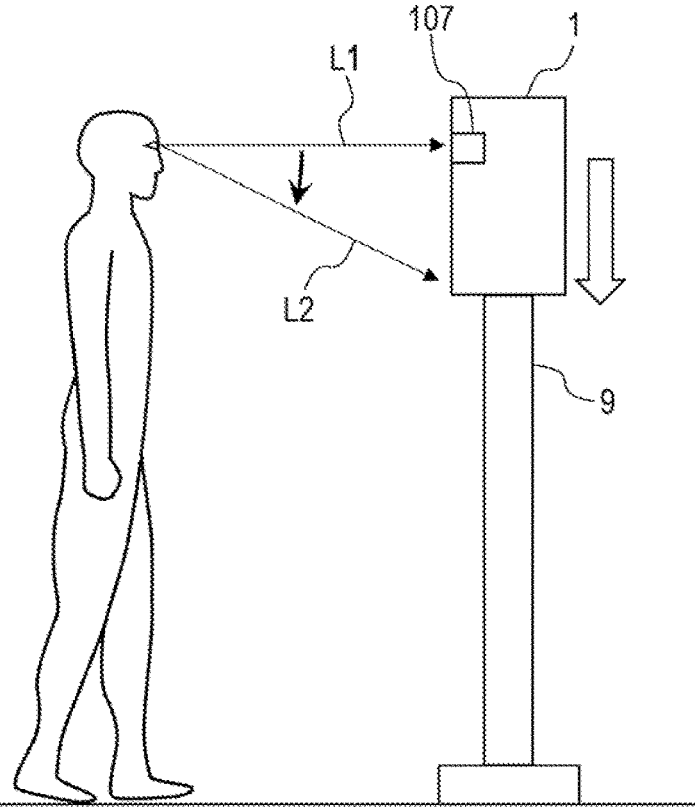
FIG. 34 is a schematic diagram showing a configuration of an iris image acquisition apparatus according to a modified example embodiment.

In the above-described example embodiment, an example of instructing the subject to move the neck is described, but instead of this, the example embodiment may be modified to move the iris image acquisition apparatus 1. FIG. 34 is a schematic diagram showing a configuration of the iris image acquisition apparatus 1 according to the modified example embodiment. The iris image acquisition apparatus 1 is supported by a movable member 9. The movable member 9 expands and contracts in accordance with control from the iris image acquisition apparatus 1 to change the height of the iris image acquisition apparatus 1. Thereby, the iris image acquisition apparatus 1 is movable in the vertical direction.

In this modified example embodiment, instead of instructing the subject to move the head while gazing at a predetermined position in steps S101 and S102, instructing the subject to move the line of sight following the movement of the iris image acquisition apparatus 1, and the movable member 9 is expanded or contracted. More specifically, the iris image acquisition apparatus 1 is moved downward in a state in which the subject gazes at the imaging device 107 of the iris image acquisition apparatus 1. When the subject's eyes follow the movement of the imaging device 107, the line of sight L1 in FIG. 34 moves to the line of sight L2. Then, the imaging device 107 captures an iris image from below. At this time, when the iris region deviates from the range in which the imaging device 107 can capture an image due to the movement, the orientation of the imaging device 107 may be adjusted so as to face the direction of the iris region.

In this modified example embodiment, the eyeball of the subject is rotated downward by moving the line of sight downward along with the movement of the imaging device 107. In this case, the iris moves downward, and the area covered by the upper eyelid or the like on the upper side of the iris may decrease. Therefore, also in this modified example embodiment, it is possible to provide an information acquisition apparatus capable of reducing the influence caused by covering the iris by the eyelid or the like.

The configuration in which the iris image acquisition apparatus 1 is moved by the movable member 9 may be replaced with a configuration in which the position of the imaging device 107 for imaging an iris image is changed. In this modification, the iris image acquisition apparatus 1 in which a plurality of imaging devices 107 are arranged in the vertical direction can be used. In place of moving the iris image acquisition apparatus 1 downward, the imaging device 107 that performs photographing is switched from the imaging device 107 on the upper side to the imaging device 107 on the lower side. In this configuration, since the movable member 9 is unnecessary, there is an advantage in that the device mechanism is simplified.

A processing method in which a program for operating the configuration of the above-described example embodiment is stored in a storage medium so as to realize the functions of the above-described example embodiment, the program stored in the storage medium is read out as a code, and executed in a computer is also included in the scope of each example embodiment. That is, a computer-readable storage medium is also included in the scope of each example embodiment. In addition, not only the storage medium storing the above-described program but also the program itself are included in each example embodiment. Further, one or more components included in the above example embodiment may be a circuit such as an application specific integrated circuit (ASIC) and a field programmable gate array (FPGA) configured to realize the functions of the components.

Examples of the storage medium include a floppy disk, a hard disk, an optical disk, a magneto-optical disk, a compact disk (CD)-ROM, a magnetic tape, a non-volatile memory card, and a ROM. In addition, the scope of each example embodiment includes not only a system in which a program stored in the storage medium is executed by itself but also a system in which a program is executed by operating on an operating system (OS) in cooperation with other software and functions of an expansion board.

The service implemented by the functions of the above-described example embodiments can also be provided to the user in the form of software as a service (SaaS).

It should be noted that any of the above-described example embodiments is merely an example of an example embodiment for carrying out this disclosure, and the technical scope of this disclosure should not be interpreted as being limited by the example embodiments. That is, this disclosure can be implemented in various forms without departing from the technical idea or the main characteristics thereof.

The whole or part of the example embodiments disclosed above can be described as, but not limited to, the following supplementary notes.

Supplementary Note 1

An information acquisition apparatus comprising:
an output means for outputting guidance information for guiding a subject to move a head while gazing at a predetermined position; and
an image acquisition means for acquiring an image including an iris of the subject after outputting the guidance information.

Supplementary Note 2

The information acquisition apparatus according to supplementary note 1, wherein the guidance information includes information for guiding the subject to move the head upward.

Supplementary Note 3

The information acquisition apparatus according to supplementary note 1 or 2, wherein the image acquisition means acquires a plurality of images having different angles of the head of the subject.

Supplementary Note 4

The information acquisition apparatus according to supplementary note 3 further comprising a feature amount generation means for generating a plurality of feature amounts for iris matching by extracting a feature amount from each of the plurality of images.

Supplementary Note 5

The information acquisition apparatus according to supplementary note 3 further comprising a feature amount generation means for generating a feature amount for iris matching by synthesizing feature amounts extracted from the plurality of images.

Supplementary Note 6

The information acquisition apparatus according to any one of supplementary notes 1 to 5 further comprising an eyelid detection means for detecting a degree of opening of an eyelid of the subject.

Supplementary Note 7

The information acquisition apparatus according to supplementary note 6, wherein the output means outputs the guidance information when the degree of opening of the eyelid detected by the eyelid detection means is less than a predetermined value.

Supplementary Note 8

The information acquisition apparatus according to any one of supplementary notes 1 to 7 further comprising an angle detection means for detecting an angle of the head of the subject.

Supplementary Note 9

The information acquisition apparatus according to supplementary note 8, wherein the guidance information includes information indicating whether or not the angle of the head of the subject is appropriate for acquiring the image.

Supplementary Note 10

The information acquisition apparatus according to supplementary note 8 or 9, wherein the guidance information includes information for guiding the subject to keep the head still when the angle of the head of the subject is appropriate for acquiring the image.

Supplementary Note 11

The information acquisition apparatus according to supplementary note 10, wherein the guidance information includes information for guiding the subject to move a line of sight while keeping the head still.

Supplementary Note 12

The information acquisition apparatus according to any one of supplementary notes 8 to 11, wherein the output means changes a display on a display device when the angle of the head of the subject is appropriate for acquiring the image.

Supplementary Note 13

The information acquisition apparatus according to any one of supplementary notes 1 to 12, wherein the guidance information includes information indicating a region of the iris of the subject in which an image has been captured.

Supplementary Note 14

The information acquisition apparatus according to any one of supplementary notes 1 to 13, wherein the output means causes a display device to display a message or an image prompting the subject to move the head.

Supplementary Note 15

The information acquisition apparatus according to any one of supplementary notes 1 to 14, wherein the output means causes an audio device to emit a sound prompting the subject to move the head.

Supplementary Note 16

The information acquisition apparatus according to any one of supplementary notes 1 to 15, wherein the output means operates a guiding member so as to prompt the subject to move the head.

Supplementary Note 17

The information acquisition apparatus according to any one of supplementary notes 1 to 16, wherein the output means causes a display device to display information indicating a place to be gazed by the subject.

Supplementary Note 18

An information acquisition apparatus comprising:
an image acquisition means for acquiring an image including an iris of a subject; and
an output means for outputting information indicating whether or not an angle of a head of the subject is appropriate for acquiring the image.

Supplementary Note 19

An information acquisition apparatus comprising:
an image acquisition means for acquiring a plurality of images each including an iris of a subject; and
a feature amount generation means for generating a feature amount for iris matching by synthesizing feature amounts extracted from the plurality of images.

Supplementary Note 20

An iris matching system comprising:
the information acquisition apparatus according to any one of supplementary notes 1 to 19; and
a matching apparatus configured to perform matching based on the image.

Supplementary Note 21

An information acquisition method comprising:
outputting guidance information for guiding a subject to move a head while gazing at a predetermined position; and
acquiring an image including an iris of the subject after outputting the guidance information.

Supplementary Note 22

An information acquisition method comprising:
acquiring an image including an iris of a subject; and
outputting information indicating whether or not an angle of a head of the subject is appropriate for acquiring the image.

Supplementary Note 23

An information acquisition method comprising:
acquiring a plurality of images each including an iris of a subject; and
generating a feature amount for iris matching by synthesizing feature amounts extracted from the plurality of images.

Supplementary Note 24

A storage medium storing a program for causing a computer to execute an information acquisition method comprising:
outputting guidance information for guiding a subject to move a head while gazing at a predetermined position; and
acquiring an image including an iris of the subject after outputting the guidance information.

Supplementary Note 25

A storage medium storing a program for causing a computer to execute an information acquisition method comprising:
acquiring an image including an iris of a subject; and
outputting information indicating whether or not an angle of a head of the subject is appropriate for acquiring the image.

Supplementary Note 26

A storage medium storing a program for causing a computer to execute an information acquisition method comprising:
acquiring a plurality of images each including an iris of a subject; and
generating a feature amount for iris matching by synthesizing feature amounts extracted from the plurality of images.

REFERENCE SIGNS LIST

1 iris image acquisition apparatus
2 matching server
3, 4, and 5 information acquisition apparatus
9 movable member
10 iris matching system
11 matching apparatus
101 and 201 processor
102 and 202 RAM
103 and 203 ROM
104 and 204 HDD
105 and 205 communication I/F
106 operation device
107 imaging device
108 display device
109 audio device
111 output unit
112 display control unit
113 image acquisition unit
114 feature amount generation unit
115 and 211 I/F unit
116 eyelid detection unit
117 angle detection unit
206 input device
207 output device
212 matching unit
213 feature amount storage unit
301 and 402 output means
302, 401, and 501 image acquisition means
303, 502 feature amount generation means
304 eyelid detection means
305 angle detection means
EY eye
IRS iris
L1 and L2 line of sight
NW Network
OB1, OB2, OB3, OB4, and OB5 object
PPL pupil
P1 and P2 iris image
R1 colored region
R2 non-colored region
R3 and R4 iris region
R5 common region
R6 synthesized region
UELD upper eyelid
UELS upper eyelashes

What is claimed is:

1. An information acquisition apparatus comprising:
a memory configured to store instructions; and
a processor configured to execute the instructions to:
  acquire an image from a camera, the image including an eye of a subject;
  determine whether a degree of opening of an eyelid of the subject in the image is equal to or greater than a reference value,
  based on a determination that the degree of opening of the eyelid of the subject is equal to or greater than a reference value, output guidance information for guiding a subject to move a head while gazing at a predetermined position; and
  acquire an image including an iris of the subject after outputting the guidance information,
  wherein the guidance information includes information for guiding the subject to move the head upward.

2. The information acquisition apparatus according to claim 1, wherein a plurality of images having different angles of the head of the subject is acquired.

3. The information acquisition apparatus according to claim 2, wherein the processor is further configured to execute the instructions to generate a plurality of feature amounts for iris matching by extracting a feature amount from each of the plurality of images.

4. The information acquisition apparatus according to claim 2, wherein the processor is further configured to execute the instructions to generate a feature amount for iris matching by synthesizing feature amounts extracted from the plurality of images.

5. The information acquisition apparatus according to claim 1, wherein the processor is further configured to execute the instructions to detect a degree of opening of an eyelid of the subject.

6. The information acquisition apparatus according to claim 5, wherein the guidance information is output when the degree of opening of the eyelid is less than a predetermined value.

7. The information acquisition apparatus according to claim 1, wherein the processor is further configured to execute the instructions to detect an angle of the head of the subject.

8. The information acquisition apparatus according to claim 7, wherein the guidance information includes information indicating whether or not the angle of the head of the subject is appropriate for acquiring the image.

9. The information acquisition apparatus according to claim 7, wherein the guidance information includes information for guiding the subject to keep the head still when the angle of the head of the subject is appropriate for acquiring the image.

10. The information acquisition apparatus according to claim 9, wherein the guidance information includes information for guiding the subject to move a line of sight while keeping the head still.

11. The information acquisition apparatus according to claim 7, wherein a display on a display device is changed when the angle of the head of the subject is appropriate for acquiring the image.

12. The information acquisition apparatus according to claim 1, wherein the guidance information includes information indicating a region of the iris of the subject in which an image has been captured.

13. The information acquisition apparatus according to claim 1, wherein a message or an image prompting the subject to move the head is displayed on a display device.

14. The information acquisition apparatus according to claim 1, wherein a sound prompting the subject to move the head is emitted from an audio device.

15. The information acquisition apparatus according to claim 1, wherein a guiding member is operated so as to prompt the subject to move the head.

16. The information acquisition apparatus according to claim 1, wherein information indicating a place to be gazed by the subject is displayed on a display device.

17. An iris matching system comprising:
the information acquisition apparatus according to claim 1; and
a matching apparatus configured to perform matching based on the image.

18. An information acquisition method comprising:
acquiring an image from a camera, the image including an eye of a subject;
determining whether a degree of opening of an eyelid of the subject in the image is equal to or greater than a reference value,
based on a determination that the degree of opening of the eyelid of the subject is equal to or greater than a reference value, outputting guidance information for guiding a subject to move a head while gazing at a predetermined position; and
acquiring an image including an iris of the subject after outputting the guidance information,
wherein the guidance information includes information for guiding the subject to move the head upward.

19. A non-transitory storage medium storing a program for causing a computer to execute an information acquisition method comprising:
acquiring an image from a camera, the image including an eye of a subject;
determining whether a degree of opening of an eyelid of the subject in the image is equal to or greater than a reference value,
based on a determination that the degree of opening of the eyelid of the subject is equal to or greater than a reference value, outputting guidance information for guiding a subject to move a head while gazing at a predetermined position; and
acquiring an image including an iris of the subject after outputting the guidance information,
wherein the guidance information includes information for guiding the subject to move the head upward.

* * * * *